(12) United States Patent
Tao et al.

(10) Patent No.: US 10,559,225 B1
(45) Date of Patent: *Feb. 11, 2020

(54) COMPUTER-IMPLEMENTED SYSTEMS AND METHODS FOR AUTOMATICALLY GENERATING AN ASSESSMENT OF ORAL RECITATIONS OF ASSESSMENT ITEMS

(71) Applicant: Educational Testing Service, Princeton, NJ (US)

(72) Inventors: Jidong Tao, Lawrenceville, NJ (US); Lei Chen, Lawrenceville, NJ (US); Chong Min Lee, Pennington, NJ (US)

(73) Assignee: Educational Testing Service, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,232

(22) Filed: May 24, 2018

Related U.S. Application Data

(63) Continuation of application No. 15/474,440, filed on Mar. 30, 2017, now Pat. No. 9,984,682.
(Continued)

(51) Int. Cl.
*G10L 15/00* (2013.01)
*G09B 19/04* (2006.01)
(Continued)

(52) U.S. Cl.
CPC ............. *G09B 19/04* (2013.01); *G06N 3/04* (2013.01); *G10L 15/16* (2013.01); *G10L 15/183* (2013.01)

(58) Field of Classification Search
CPC ............ G09B 7/02; G09B 19/04; G10L 15/01
(Continued)

(56) References Cited

U.S. PATENT DOCUMENTS 6,205,421 B1 * 3/2001 Morii ..................... G10L 19/06
704/226
8,209,173 B2 6/2012 Bejar et al.
(Continued)

OTHER PUBLICATIONS

Bernstein, Jared, Van Moer, Alistair, Cheng, Jian; Validating Automated Speaking Tests; Language Testing, 27 (3); pp. 355-377; 2010.
(Continued)

*Primary Examiner* — Daniel Abebe
(74) *Attorney, Agent, or Firm* — Jones Day

(57) ABSTRACT

Provide automatic assessment of oral recitations during computer based language assessments using a trained neural network to automate the scoring and feedback processes without human transcription and scoring input by automatically generating a score of a language assessment. Providing an automatic speech recognition ("ASR") scoring system. Training multiple scoring reference vectors associated with multiple possible scores of an assessment, and receiving an acoustic language assessment response to an assessment item. Based on the acoustic language assessment automatically generating a transcription, and generating an individual word vector from the transcription. Generating an input vector by concatenating an individual word vector with a transcription feature vector, and supplying an input vector as input to a neural network. Generating an output vector based on weights of a neural network; and generating a score by comparing an output vector with scoring vectors.

20 Claims, 14 Drawing Sheets

Related U.S. Application Data

(60) Provisional application No. 62/315,182, filed on Mar. 30, 2016.

(51) Int. Cl.
 *G06N 3/04* (2006.01)
 *G10L 15/183* (2013.01)
 *G10L 15/16* (2006.01)

(58) Field of Classification Search
 USPC .......................................................... 704/232
 See application file for complete search history.

(56) References Cited

U.S. PATENT DOCUMENTS

| | | | |
|---|---|---|---|
| 2002/0193999 A1* | 12/2002 | Keane | H04M 7/006 704/270 |
| 2013/0030808 A1 | 1/2013 | Zechner et al. | |
| 2013/0185057 A1 | 7/2013 | Yoon et al. | |

OTHER PUBLICATIONS

Chen, Lei; Applying Feature Bagging for More Accurate and Robust Automated Speaking Assessment; IEEE Workshop on Automatic Speech Recognition and Understanding; pp. 473-477; Dec. 2011.

Chen, Stanley, Goodman, Joshua; An Empirical Study of Smoothing Techniques for Language Modeling; Computer Speech & Language, 13(4); pp. 310-318; 1999.

Cheng, Jian, Chen, Xin, Metallinou, Angeliki; Deep Neural Network Acoustic Models for Spoken Assessment Applications; Speech Communication, 73; pp. 14-27; Oct. 2015.

Eskenazi, Maxine; An Overview of Spoken Language Technology for Education; Speech Communication, 51(10); pp. 832-844; 2009.

Gales, M.J.F., Woodland, P.C.; Mean and Variance Adaptation Within the MLLR Framework; Computer Speech & Language, 10(4); pp. 249-264; 1996.

Garimella, Sri, Mandal, Arindam, Strom, Nikko, Hoffmeister, Bjorn, Matsoukas, Spyros, Parthasarathi, Sree H.K., Robust i-Vector Based Adaptation of DNN Acoustic Model for Speech Recognition; Proceedings of Interspeech; pp. 2877-2881; 2015.

Gauvain, Jean-Luc, Lee, Chin-Hui; Maximum a Posteriori Estimation for Multivariate Gaussian Mixture Observations of Markov Chains; IEEE Transactions on Speech and Audio Processing, 2(2); pp. 291-298; Apr. 1994.

Gibson, Matthew; Minimum Bayes Risk Acoustic Model Estimation and Adaptation; Ph.D. Dissertation, University of Sheffield; 2008.

Gupta, Vishwa, Kenny, Patrick, Ouellet, Pierre, Stafylakis, Themos; I-Vector-Based Speaker Adaptation of Deep Neural Networks for French Broadcast Audio Transcription; IEEE International Conference on Acoustics, Speech and Signal Processing (ICASSP); pp. 6334-6338; May 2014.

Higgins, Derrick, Chen, Lei, Zechner, Klaus, Evanini, Keelan, Yoon, Su-Youn; The Impact of ASR Accuracy on the Performance of an Automated Scoring Engine for Spoken Responses; presentation in National Council on Measurement in Education Meeting; 2011.

Higgins, Derrick, Burstein, Jill; Sentence Similarity Measures for Essay Coherence; Proceedings of the 7th International Workshop on Computational Semantics (WCS); Jan. 2007.

Karafiat, Martin, Burget, Lukas, Matejka, Pavel, Glembek, Ondrej, Cernocky, Jan; iVector-based Discriminative Adaptation for Automatic Speech Recognition; IEEE Workshop on Automatic Speech Recognition and Understanding (ASRU); pp. 152-157; Dec. 2011.

Le, Quoc, Mikolov, Tomas; Distributed Representations of Sentences and Documents; Proceedings of the 31st International Conference on Machine Learning; pp. 1188-1196; 2014.

Loukina, Anastassia, Zechner, Klaus, Chen, Lei, Heilman, Michael; Feature Selection for Automated Speech Scoring; Proceedings of the 10th Workshop on Innovative Use of NLP for Building Educational Applications; pp. 12-19; Jun. 2015.

Maas, Andrew, Daly, Raymond, Pham, Peter, Huang, Dan, Ng, Andrew, Potts, Christopher; Learning Word Vectors for Sentiment Analysis; Proceedings of the 49th Annual Meeting of the Association for Computational Linguistics; pp. 142-150; Jun. 2011.

Metallinou, Angeliki, Cheng, Jian; Using Deep Neural Networks to Improve Proficiency Assessment for Children English Language Learners; Interspeech; pp. 1468-1472; Sep. 2014.

Mikolov, Tomas, Chen, Kai, Corrado, Greg, Dean, Jeffrey; Efficient Estimation of Word Representations in Vector Space; Proceedings of the Workshop at ICLR; 2014.

Peddinti, Vijayaditya, Povey, Daniel, Khudanpur, Sanjeev; A Time Delay Neural Network Architecture for Efficient Modeling of Long Temporal Contexts; Proceedings of INTERSPEECH; 2015.

Rehurek, Radim, Sojka, Petr; Software Framework for Topic Modelling With Large Corpora; Proceedings of the LREC Workshop on New Challenges for NLP Framework; pp. 45-50; May 2010.

Stolcke, Andreas; SRILM—An Extensible Language Modeling Toolkit; Proceedings of International Conference on Spoken Language Processing; Denver, CO; pp. 901-904; 2002.

Tao, Jidong, Evanini, Keelan, Wang, Xinhao; The Influence of Automatic Speech Recognition Accuracy on the Performance of an Automated Speech Assessment System; IEEE Spoken Language Technology Workshop (SLT); pp. 294-299; 2014.

Tao, Jidong, Ghaffarzadegan, Shabnam, Chen, Lei, Zechner, Klaus; Exploring Deep Learning Architecture for Automatically Grading Non-Native Spontaneous Speech; Proceedings of IEEE ICASSP; pp. 6140-6144; 2016.

Tao, Jidong; Acoustic Model Adaptation for Automatic Speech Recognition and Animal Vocalization Classification; Marquette University, PhD. Dissertation; May 2009.

Van Dalen, Rogier, Knill, Kate, Gales, Mark; Automatically Grading Learners' English Using a Gaussian Process; SLaTE Workshop; Sep. 2015.

Xie, Shasha, Chen, Lei; Evaluating Unsupervised Language Model Adaptation Methods for Speaking Assessment; Proceedings of the 8th Workshop on Innovative Use of NLP for Building Educational Applications; pp. 288-292; Jun. 2013.

Xie, Shasha, Evanini, Keelan, Zechner, Klaus; Exploring Content Features for Automated Speech Scoring; Conference of the North American Chapter of the Association for Computational Linguistics: Human Technologies; pp. 103-111; 2012.

Zhang, Xiaohui, Trmal, Jan, Povey, Daniel, Khudanpur, Sanjeev; Improving Deep Neural Network Acoustic Models Using Generalized Maxout Networks; IEEE International Conference on Acoustic, Speech and Signal Processing (ICASSP); pp. 2015-2219; 2014.

Zechner, Klaus; What Did They Actually Say? Agreement and Disagreement Among Transcribers of Non-Native Spontaneous Speech Responses in an English Proficiency Test; Proceedings of the ISCA SLaTE Workshop; pp. 25-28; 2009.

Zechner, Klaus, Higgings, Derrick, XI, Xiaoming, Williamson, David; Automatic Scoring of Non-Native Spontaneous Speech in Tests of Spoken English; Speech Communication, 51(10); pp. 883-895; Oct. 2009.

\* cited by examiner

FIG. 10a
1000

Generate a vector associated with acoustic data file
1002

↓

Supply first acoustic frame(s) of an acoustic data file concatenated with the vector to an input layer of a three layer neural network
1004

↓

Supply a second acoustic frame of the acoustic data file as a the target layer of the neural network
1006

↓

Generate a distributed representation of the second acoustic frame based on the weights of the neural network
1008

FIG. 10b
1050

Automatically generate a transcription of an acoustic data file
1050

↓

Generate a vector associated with acoustic data file based on the transcription
1052

↓

Supply a first word of the transcription concatenated with the vector to an input layer of a three layer neural network
1004

↓

Supply a second word transcription as a the target layer of the neural network
1006

↓

Generate a distributed representation of the second word based on the weights of the neural network
1008

COMPUTER-IMPLEMENTED SYSTEMS AND METHODS FOR AUTOMATICALLY GENERATING AN ASSESSMENT OF ORAL RECITATIONS OF ASSESSMENT ITEMS

CROSS REFERENCE TO RELATED APPLICATIONS

This application is a continuation application of U.S. patent application Ser. No. 15/474,440, filed Mar. 30, 2017, entitled "Computer-Implemented Systems and Methods for Automatically Generating an Assessment of Oral Recitations of Assessment Items," which claims priority to U.S. Provisional Application No. 62/315,182, filed Mar. 30, 2016, entitled "DNN Online with iVectors Acoustic Modeling," both of which are incorporated herein by reference in their entireties.

FIELD

The technology described in this patent document relates generally to automating assessments of oral recitations during computer based assessments.

BACKGROUND

Automatic speech recognition ("ASR") technology can be applied to computer based assessments of language proficiency in order to automate scoring, transcription, and feedback generation responsive to oral recitation of an assessment text. Generally, ASR technology suffers from several factors including among other things: low accuracy on non-native spontaneous speech is low; (b) data mismatch between an ASR system during training and during real assessments; and (c) content relevance and context are not widely employed in operational scoring models due to various technological and logistical issues. ASR technology also fails to approach human level scoring of non-native language speakers.

SUMMARY

Systems and methods as described herein provide automatic assessment of oral recitations during computer based language assessments using a trained neural network to automate the scoring and feedback processes without human transcription and scoring input. In a first aspect, a method of automatically generating a score of a language assessment is disclosed. The method includes providing an automatic speech recognition ("ASR") scoring system. Then, training multiple scoring reference vectors associated with multiple possible scores of an assessment. And receiving an acoustic language assessment response to an assessment item. Based on the acoustic language assessment automatically generating a transcription. And generating an individual word vector based on one or more words selected from the transcription. Using a distributed word vector, generating an input vector by concatenating an individual word vector with a transcription feature vector including features common to the transcription as a whole, and supplying an input vector as input to a neural network. Then, generating an output vector based on internal weights of a neural network; and generating a score by comparing an output vector with multiple scoring vectors, a score being based on which of multiple scoring vectors is closest to an output vector.

In an interrelated aspect, a language model for automatically scoring acoustic language assessments is generated. The method includes receiving a library of generic acoustic response transcriptions to a plurality of generic assessment items. Then, receiving context specific acoustic responses to a context specific assessment item. And, generating a generic language model by training based on a plurality of generic acoustic response transcriptions. Context specific acoustic response are supplied to an ASR in order to generate a context specific transcription corresponding to each context specific acoustic response. The context specific acoustic responses are associated with new assessment items, and a context specific language model is generated by training based one context specific transcriptions. The generic language model and the context specific language model are then interpolated.

In an interrelated aspect, a method for automatically generating an assessment score indicative of language proficiency is disclosed. The method involves training a first language model based on a generic acoustic library. And, training a second language model based on a context specific acoustic library. A third language model is generated by performing linear interpolation using the first language model and the second language model. Then, an assessment is received including acoustic data representative of a spoken recitation of a portion of an assessment. A first distributed representation of the assessment acoustic data is generated; and supplied to a third language model to obtain output features associated with an assessment acoustic data. And, an assessment score is generated based on output features and indicative of language proficiency of a spoken recitation.

In interrelated aspects, system and software are provided for automatically generating a score of a language assessment comprising instructions for execution on a processing system comprising one or more data processors in communication with a non-transitory computer-readable medium encoded with instructions for commanding the processing system to execute steps. The steps include accessing, with an automatic speech recognition (ASR) scoring system, one or more trained scoring reference vectors. And receiving an assessment response. An individual word vector is generated based on a word selected from the assessment response. And an input vector is generated by concatenating the individual word vector with an assessment response feature vector including features common to the assessment response as a whole. The input vector is then supplied as input to a neural network of the ASR to obtain an output vector based on the input vector and internal weights of the neural network. And a score is generated by determining which of the one or more trained scoring vectors is closest to the output vector.

In interrelated aspects, system and software are provided for automatically generating a score of a language assessment comprising instructions for execution on a processing system comprising one or more data processors in communication with a non-transitory computer-readable medium encoded with instructions for commanding the processing system to execute steps. The steps include accessing a library of generic responses to a plurality of generic assessment items. And receiving context specific responses to a context specific assessment item. A generic language model associated with the generic responses is generated. And a context specific language model associated with the context specific responses is also generated. A model for automatically scoring language assessments is then generated by interpolating the context specific language model with the generic language model.

In interrelated aspects, system and software are provided for automatically generating a score of a language assessment comprising instructions for execution on a processing system comprising one or more data processors in communication with a non-transitory computer-readable medium encoded with instructions for commanding the processing system to execute steps. According to the instructions, an assessment acoustic data representative of a spoken recitation of a portion of an assessment text corpus is received. A first distributed representation of the assessment acoustic data is generated. And the first distributed representation is supplied to a first language model to obtain output features associated with the assessment acoustic data. And an assessment score is generated based on the output features and indicative of the language proficiency of the spoken recitation. In embodiments the first language model is generated by training a second language model based on a generic acoustic library, and training a third language model based on a context specific acoustic library. Then the first language model is generated by performing linear interpolation using the second language model and the third language model.

BRIEF DESCRIPTION OF THE DRAWINGS

FIGS. 10a-10b are flow diagrams depicting a processor-implemented method for providing a distributed representation of an acoustic data file;

DETAILED DESCRIPTION

Certain embodiments described herein utilize deep learning neural network technology. Deep learning, which can represent high-level abstractions in data with an architecture of layered and interconnected multiple non-linear transformations, is employed in automatic speech recognition ("ASR") to provide automatic assessment of language proficiency. Compared to the conventional HMM-GMM based approach, the aligned pairs of context-dependent decision-tree based tied states (senones) and corresponding acoustic feature vectors are modeled by deep learning neural network ("DNN"), instead of Gaussian Mixture Models ("GMM"), which can benefit from long-span (e.g., 11 frames), high dimensional and strongly correlated input features; highly non-linear mapping functions between input and output features; distributed representation of observed data by the interactions of many hidden factors; and training model parameters discriminatively.

DNN-based approaches are described in certain embodiments herein to improve the performance of automatic spoken language assessment. Specifically, certain systems and methods as described herein include methodologies for automatic speech assessment on a non-native spontaneous speech audio library as part of automatic language assessment that is capable of achieving results comparable with human scored assessments. Certain embodiments describe the use of i-vectors for training an acoustic model. Certain embodiments further describe the use of DNN architectures that employ a multi-slice temporal windowing of frames methodology that includes sub-sampling techniques to reduce computational costs. Additionally, certain systems and methods as described herein include the use of distributed representations of acoustic data as opposed to convent vector analysis ("CVA") or other standard approaches. Certain aspects described herein employ language model adaption in order to adapt a generic language model based on a context associated with the assessment to more accurately assess untrained assessment prompts, or texts, that were not covered during ASR training of the generic language model.

Figure 1:
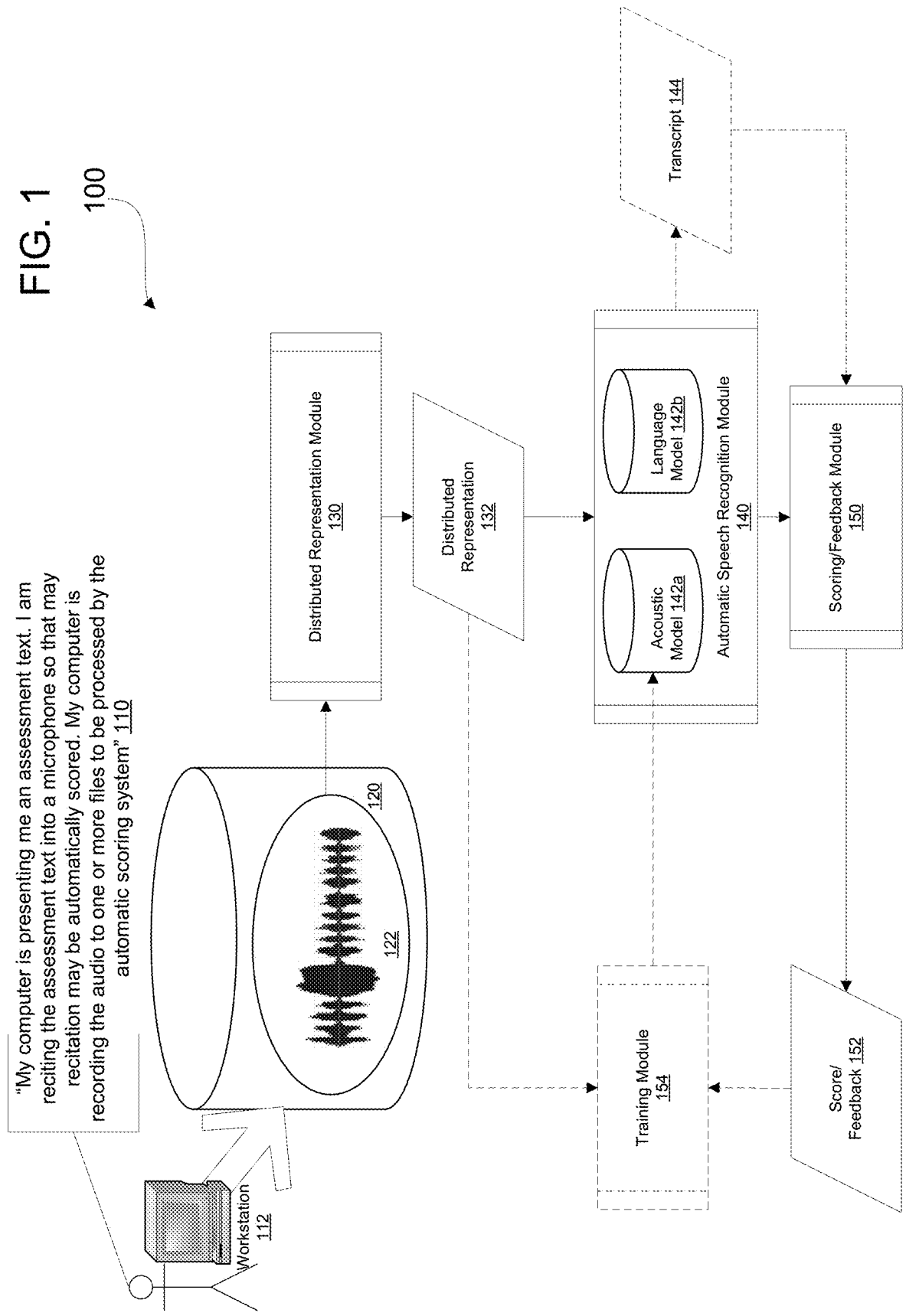
FIG. 1 is a block diagram depicting an exemplary automatic speech scoring engine.

FIG. 1 is a block diagram depicting an exemplary automatic speech scoring engine 100. A user responds 110 to an assessment item presented to the user on a display by speaking into an acoustic recording device attached to a computer processing system 112. The computer processing system 112 stores the acoustic recording 122 in a computer data structure 120 for later or immediate processing. The computer data structure 120 may be stored and processed locally or transmitted to a server (not shown) for storage and processing. The acoustic recording 122 may be processed by a distributed representation generation process 130 to generate a distributed representation 132 of the acoustic recording. Alternatively, process 130 may generate a distributed representation 132 by identifying a set of acoustic features. In embodiments the distributed representation 132 is a series of vectors, each including a predetermined number of elements comprising information associated with one or more frames of the acoustic recording.

The distributed representation 132 is supplied to an automatic speech recognition ("ASR") process 140 that analyzes each vector utilizing an acoustic model 142a. The ASR may additionally rely on a separate and distinct language model 142b. In embodiments an ASR model may encompass a process in which an acoustic model 142a interacts with a language model. In embodiments, the acoustic model 142a is a deep learning neural network that is trained to process the distributed representation 132 vectors to obtain output vectors which are compared against one or more reference vectors. The results of the ASR process 140 is then supplied to a scoring process, which may rely on scoring reference vectors, or a feedback generation process 150 to generate a score or feedback 152. Optionally, the ASR process 140 generates a transcription 144 of the acoustic recording, which may also be supplied to the scoring/feedback module 150 to inform the scoring/feedback process. Optionally, one or more scores 152 and associated distributed representations 132 (or acoustic recordings) can be later (or immediately) supplied to a language/acoustic model training process 154 in order to further train and improve the acoustic model 142.

Figure 2:
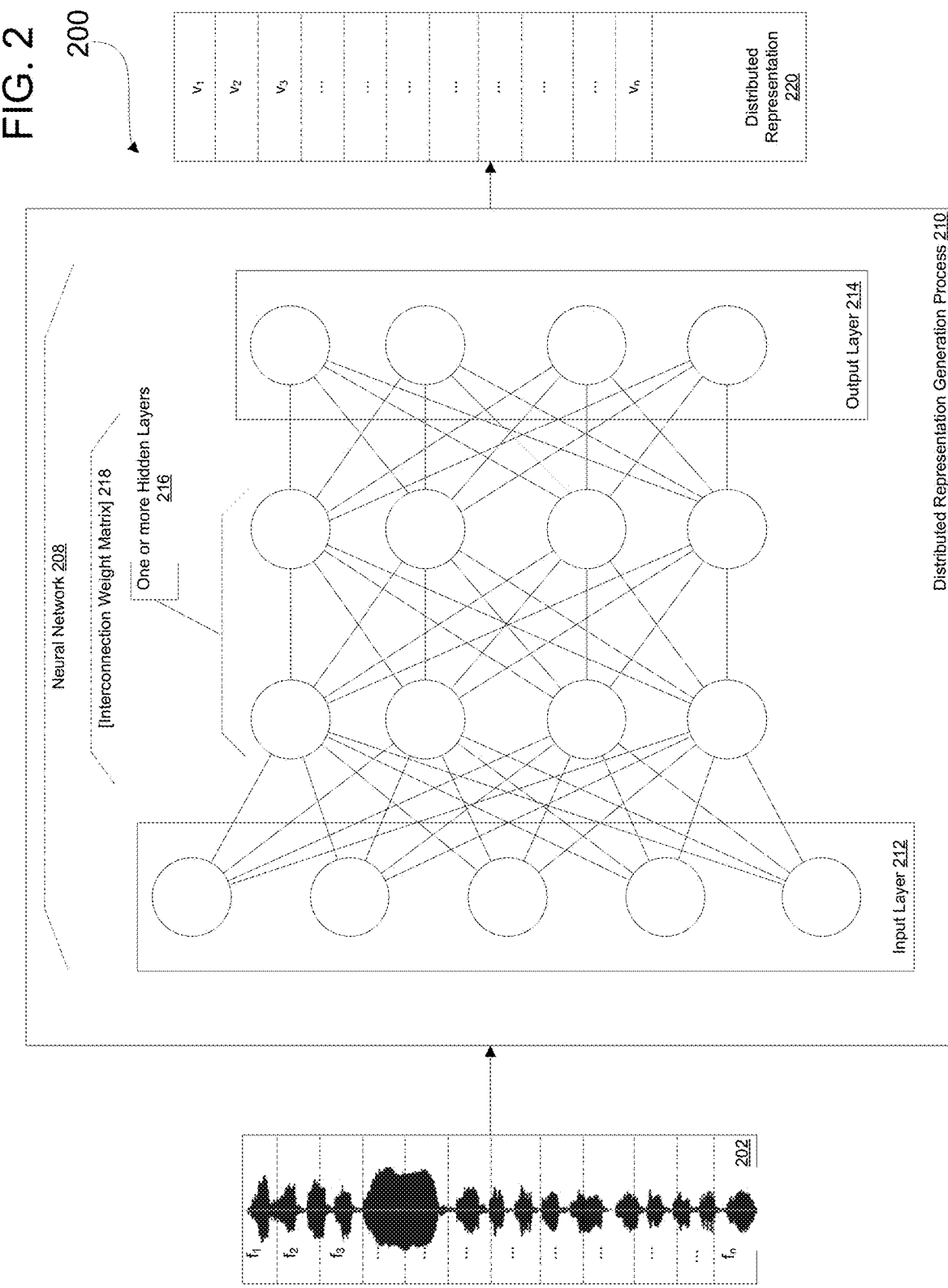
FIG. 2 illustrates a block diagram depicting an exemplary process for generating a distributed representation vector.

Generating distributed representations of acoustic recordings can be accomplished using any suitable method. In embodiments, vectors are generated as frequency content vectors. Alternatively, vectors may be modeled by conventional GMM-HMMs. FIG. 2 illustrates a block diagram 200 depicting an exemplary process for generating a distributed representation vector 220 comprising vectors $v_1, v_2, \ldots v_n$ respectively associated with frames $f_1, f_2, \ldots, f_n$ selected from acoustic recording 202. Acoustic recording 202 is supplied to a distributed representation generation module 210, which relies on a neural network 208 comprising an input layer 212 an output layer 214 and one or more hidden layers 216, wherein the input layer 212, the output layer 214 and the one or more hidden layers 216 are interconnected according to a weight matrix 218. Distributed representation generation module 210 may generate a distributed representation relying on such an exemplary neural network using various training methods, such as distributed memory (DM) and distributed bag of words (DBOW). Distributed representation generation process 210, may segment the acoustic recording 202 in any suitable manner. Distributed generation process 210 may generate segments as frames of a particular length (e.g. 1 ms, 10 ms, 25 ms). Alternatively, the acoustic recording 202 is submitted to a speech-to-text process, generating a string of words or word values. Also, regardless of how the segments are generated, the segments may be vectorized, by extracting features associated with each segment, e.g. based on the linguistic features of the speaker, or based on text features of a transcription. For example, as depicted, acoustic recording 202 is presented as a series of audio file frames f1, f2, f3, ... fn; but alternatively, each frame may be a vector representation.

Figure 3:
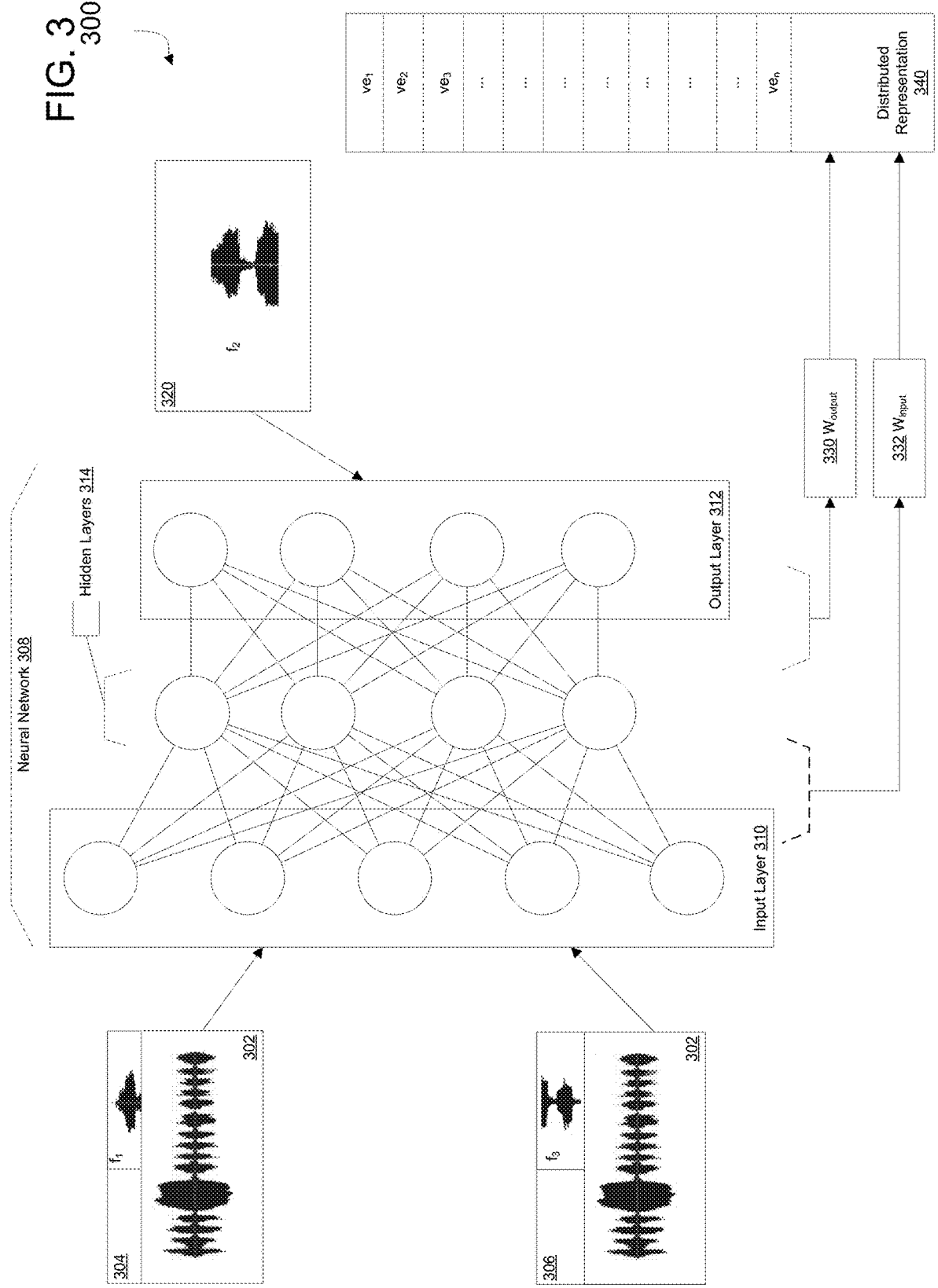
FIG. 3 illustrates a block diagram depicting an exemplary process for generating a distributed representation using context vectors.

FIG. 3 illustrates a block diagram 300 depicting another exemplary process for generating a distributed representation 340 using context vectors 304 and 306 by employing a continuous bag of words ("CBOW") approach. First, an acoustic recording of an assessment item is decomposed into a series of frames, e.g. $f_1, f_2, f_3, \ldots, f_n$. Each frame may be represented by a vector, e.g. a vector of sample data for the given frame. For a given target frame 320, representative of frame $f_2$, one or more context vectors are supplied, as shown two context vectors 304 and 306 are supplied to the input layer 310 of a three layer neural network 308. The context vectors 304 and 306 comprise the surrounding frames of frame $f_2$, namely $f_1$ and $f_3$. In embodiments additional context vectors may be supplied for a given target. The context vectors also include a semantic vector 302 that is associated with the overall acoustic recording. Alternatively a semantic vector 302 may be associated with a portion of the acoustic recording that is less than the entire recording. The semantic vector 302 can be thought of as another frame, but one that acts as memory carrying with it information about what is missing from the current frame, for example it may contain information about the overall topic of the recitation. As discussed above, while depicted as audio data, $f_1, f_2, f_3$ may alternatively be textual features of a transcription of the audio process.

In embodiments the context vector 304 and 306 include the frame data concatenated with the semantic vector 302. Alternatively, the context vector may comprise the frame data averaged with the semantic vector 302. Supplying the context vectors 304 and 306 for a given target 320, the neural network 308 is trained by modifying the interconnection weights, $W_{input}$ 330 (that interconnect the input layer 310 and the hidden layer 314) and $W_{output}$ 332 (that interconnect the hidden layer 314 and the output or target layer 312). Once trained, $W_{input}$ 330 and $W_{output}$ 332, or some combination, or sub-combination, thereof are output to serve as, or to serve as the basis for generating, one or more output vectors, e.g. $v_{e1}, v_{e2}, v_{e3}, \ldots, v_{en}$, of the distributed representation 340. As illustrated, two context vectors 304 and 306 are utilized, but in other embodiments various numbers of context vectors may be employed. In embodiments 5 or 10 context vectors may be employed. The choice of number of context vectors can be optimized based on the amount of system resources available and the trade-off between performance increase over additional context vectors. As depicted, acoustic recording frames are presented as a series of audio file frames f1, f2, f3, ..., fn; but alternatively, each frame may be a vector representation.

As illustrated the CBOW approach generates a set of weights that allow the neural network to predict a frame $f_2$ based on the surrounding frames $f_1$ and $f_3$. Other techniques may be employed to generate a distributed representation utilizing a neural network. For example, a skipgram approach may be employed that attempts to predict a neighboring word given a single word as input. Similarly a DBOW or DM approach, and variations thereof can be employed to generate distributed representations of the acoustic recordings. For example, variations of DM are DMC and DMM, where DMC concatenates a context vectors, e.g. 304, 306, whereas DMM averages them. In embodiments employing DMC and DMM, for a given target, or predicted, word the number of surrounding context words is five and ten respectively. In a DBOW approach, the model is forced to learn to predict a group of words randomly sampled from the given input vector. In practice, DM and DBOW may be combined, and in embodiments DBOW and DMC model pairs and DBOW and DMM model pairs are employed. Having generated distribute representations, e.g. 132, 220, 340, referring to FIG. 1, the representation is supplied to an ASR process relying on an acoustic model 142 to generate output features for scoring. Training an acoustic scoring model useful for automatic scoring of speech assessments, and particularly, speech assessments of non-native speakers, is discussed below.

Figure 4:
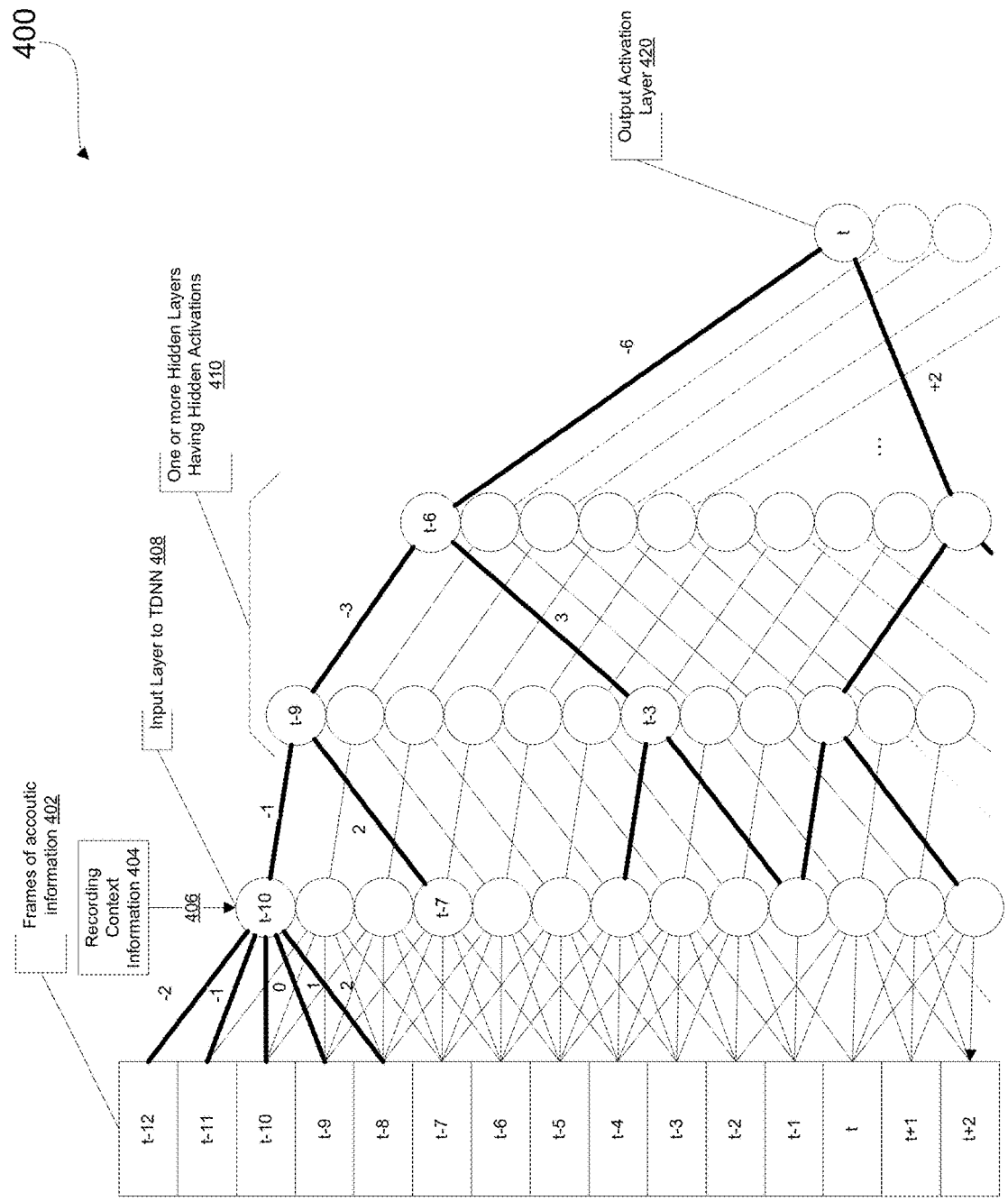
FIG. 4 illustrates a model of a portion of a time delay neural network.

FIG. 4 illustrates a visual model 400 of a portion of a time delay neural network "TDNN". A TDNN will learn long term temporal dynamics and dependencies of an acoustic recording based on short term feature representations, e.g. representations of frame level features. The TDNN employs multi-splicing of acoustic frames 402 within a narrow temporal context at the input layer 408, with an increasingly wider temporal context at each subsequent layer, with the last layer, or output activation, 420 splicing hidden activations over the widest temporal context. As depicted an output activation for time t (where t serves as a temporal index), is dependent on a number of multi-spliced and sub-sampled input frames (or vectors associated with frames), from t−12 to sometime t+n (not shown) in the future. As shown, input layer 408 perceptrons (or neuron) receiving input over a relatively narrow temporal range, i.e. relative to a given frame, an input perceptron receives −2, −1, 0, 1, 2, whereas at each successive hidden layer 410 of perceptrons, the temporal range widens while receiving less input activations. So, at the output activation layer 420, only two hidden activations serve as input and have a wider temporal span, i.e. from −6 to 2. As depicted an additional context vector 404 is also supplied to each input perceptron of the input layer 408. For a given t, this context vector 404 may remain the same or it may vary. The context vector may contain a set of vectors, each associated with a particular input frame. For example, the context vector(s) 404 may be a single content context vector or an i-vector as discussed further below, or a set of i-vectors. As depicted, 404 is supplied by connection 406, to input layer 408, and is intended to represent supplying the context vector(s) 404 to all of the input layer 408 perceptrons. Also, note that the input frames may be input frames of sampled acoustic data, and alternatively may be a feature vector representative of the acoustic frames.

Neural network automatic speech recognition systems can take a variety of forms. In one example, i-vectors are utilized, where an i-vector is a compact representation of a speech utterance in a low-dimensional subspace. In an i-vector model, a given speaker-, context-, or channel-dependent supervector M can be modeled as:

$$M=m+Tw$$

where m represents a speaker-, context-, or channel-independent supervector, which can be estimated by e.g. GMM; T, a low rank matrix, represents total variability space; and the components of the vector w are total factors, segment-specific standard normal-distributed vectors, also called i-vectors, and estimated by maximum a posterior (MAP). The matrix T is estimated by an EM algorithm.

In one example, speech utterances are first converted to a sequence of acoustic feature vectors, for example 20 dimensional mel-frequency cepstral coefficients (MFCC) and their dynamic counterparts; after that speaker-, context-, or channel-independent super-vectors, which accumulate zeroth, first, and second order sufficient statistics, are computed by using the posterior probabilities of the classes from a pre-trained model; next a total variability matrix, T, is used to transform the super-vectors to the low dimensional i-vectors, which contains both speaker, context, and channel variability; then linear discriminant analysis (LDA) may be used to do channel compensation; finally a resultant i-vector is used to train a language model.

A DNN is an artificial neural network with multiple hidden layers between its input and output. For each hidden unit, a nonlinear activation function is used to map all inputs from the lower layer to a scalar state, which is then fed to the upper layer. Generally a system uses a sigmoid function as its activation function. Alternatively, rectified linear units ReLU are employed. Weights and bias are generally initialized in pre-training, and then trained by optimizing a cost function which measures the discrepancy, or error, between target vectors and a predicted output with a back-propagation (BP) procedure. Although, in many cases pre-training is not necessary. The DNN may be trained, for example, by using batch gradient descent, and then optimized by a "minibatch" based stochastic gradient ascent algorithm.

It has been discovered that a phonetically-aware DNN can be used for acoustic modeling in automatic speech recognition (ASR). In one example, a system utilizes a DNN in an ASR task, which is carried on a non-native spontaneous speech corpus, for example a recitation text. DNN has many advantages over other methods of acoustic modeling. There is no underlying assumption of distribution and modality for input data in the DNN, e.g., continuous and binary features can be augmented and modeled together naturally. The deep learning technologies, e.g., transfer learning or multi-task learning, which can exploit the commonalities between the training data of different learning tasks so as to transfer learned knowledge across them, can also be applied to acoustic modeling. It also shows that the noise-aware, room-aware, context-aware DNN training, which appends noise, reverberation, speaker-profile, or context information to input feature vectors, can reduce word error rate (WER) in noisy or reverberant speech recognition tasks. Multi-task learning is also successfully employed to improve phoneme recognition and multilingual speech recognition.

Certain examples use metadata to enhance training for non-native speaker assessment. A DNN trained on noise-aware input feature vectors and speaker profile vectors and other context vectors are employed. If o represents observed feature vector, which is used as input vector for DNN training, it is formed as, $$o_t=[x_{t-T}, \ldots, x_{t-1}, x_t, x_{t+1}, \ldots, x_{t+T}, W_1]$$

where t is the frame index; T is the number of frame for sliding window; and w is the context estimation vector. The example system assumes that the noise is stationary per test-taker's utterance, thus in embodiments w approximated by the average of the beginning and ending frames and fixed over an utterance. For a given input acoustic recording w for a given frame can be estimated based on previous frames. Additionally, w may account for phonetic content senones classification and the test takers' native language classification among other things.

Figure 5:
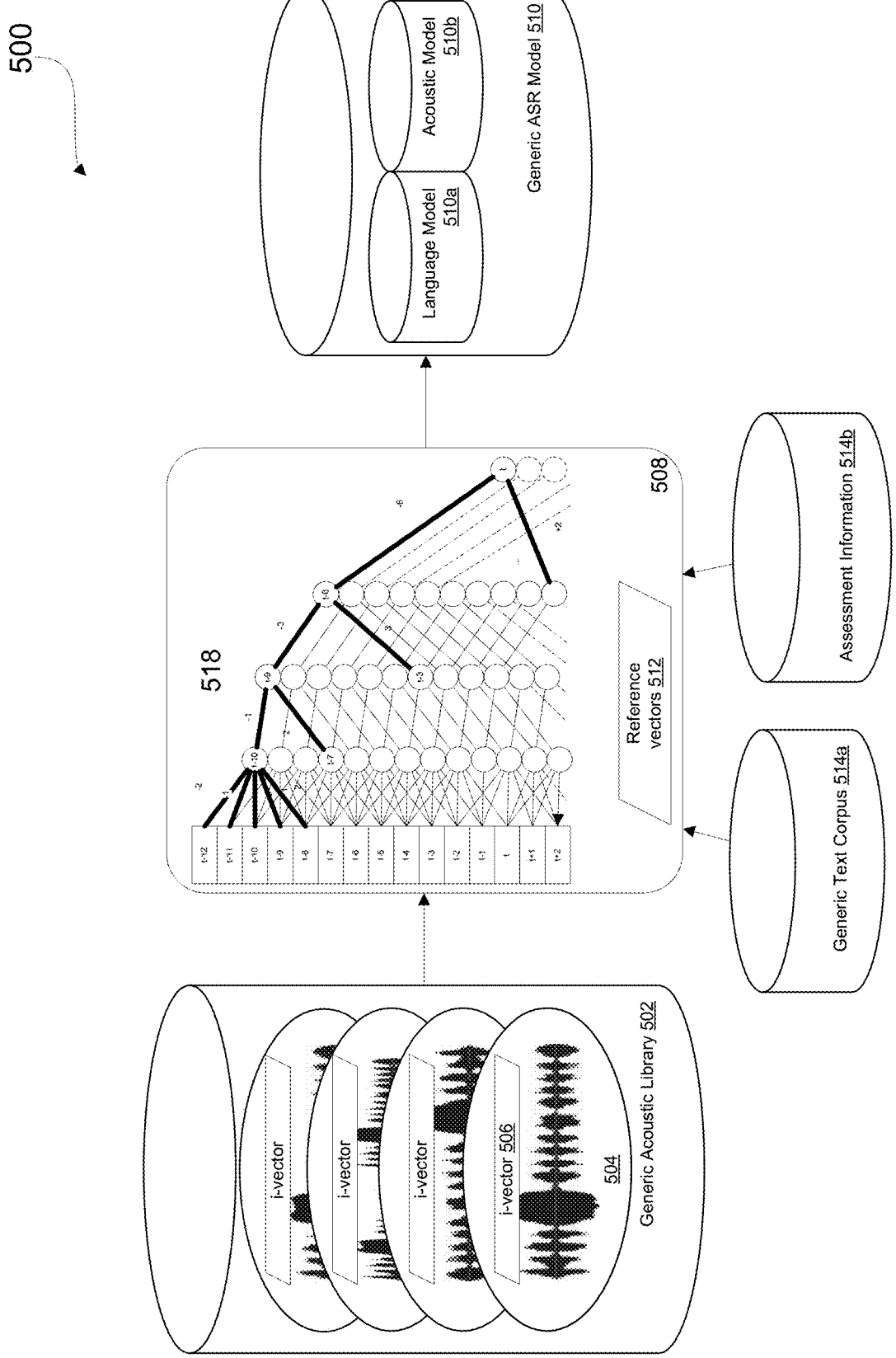
FIG. 5 illustrates a block diagram for training of a generic language model using a generic acoustic corpus.

FIG. 5 illustrates training of a generic ASR model 510 using a generic acoustic corpus 502. In the exemplary embodiment depicted a generic acoustic library 502 includes a library of acoustic data 504, which may be a library of audio data files of pre-recorded audio, for example the audio data may have been created by users taking previous versions of language assessments. For example, the audio data of the generic acoustic library 502 may be assessment item responses to recitation assessment items performed by users of the TOEFL (i.e., Test of English as a Foreign Language) Practice Online®. This is a practice program to prepare for the TOEFL® internet based testing assessment, or TOEFL iBT® test. The TOEFL iBT® is a test that measures one's ability to use and understand the English language at the university level. It evaluates how well users combine listening, reading, speaking and writing skills in order to perform academic tasks. The TPO is a test that is prepared using "retired" TOEFL iBT® test questions that will no longer be utilized in operational tests. The TOEFL® TPO uses a different test delivery interface than the iBT in order to allow users to take tests at their homes using their home computers and audio recording devices. The TPO in practice is scored automatically by uploading TPO data to a server for scoring. In embodiments, a score may be generated automatically by a scoring model residing in a user's computer. Unlike the TOEFL iBT®, because the TPO is a home based test without standardized equipment the recording channel information, and the surrounding environment will vary with each test taker.

The ASR engine used in the TPO automatic speech scoring has been trained from a large-sized TOEFL iBT transcribed corpus. Question types or prompts in TPO ASR are trained using historic responses iBT responses that have been captured using controlled testing environments and scored by human review according to a four point scale scoring rubric. The TPO ASR has not been trained on any operational iBT questions, and therefore will not include training on newly added TPO prompts that are recently retired from the TOEFL iBT prompt bank. Therefore, for more accurate scoring, it is necessary to further train the TPO language model to improve the ASR system in order to accurately score newly added prompts. In order to properly train the ASR requires generating content measurements of iBT responses to newly added questions. Previously, this has required human intervention in order to assess the historic iBT responses to retired prompts in order to generate transcriptions and scores that can then be supplied with the retired iBT assessment responses in order to further train the ASR. This added manual transcriptions and scoring tasks include extra costs and undermine the ability to provide automatic scoring of TPO responses based on an ASR language model trained on iBT responses. Thus it is desirable to generate automatic transcriptions of acoustic responses to new questions in order to train a context specific language model based on the automatically generated transcriptions of the acoustic responses. For example the TOEFL iBT® has created a large volume of acoustic responses, which are rarely human transcribed due to cost. As TOEFL iBT® questions are retired, and incorporated into the TPO, it is desirable to train the ASR language model to be able to score the newly retired responses without the need to perform manual transcription of the large number of historical acoustic responses available in the TOEFL iBT® from previous takers of the TOEFL iBT® test.

Referring to FIG. 5 the ASR language model generation process 508 accepts the generic acoustic library 502 assessment response acoustic data 504 and the associated content vectors 506. Each acoustic data file 504 may be accompanied by a corresponding i-vector 506, as described above. The i-vector may have been previously generated and associated with the acoustic data 504, for example during a TPO user's interaction with the TPO test, or it may alternatively be generated during the process of supplying the generic acoustic library 502 to the ASR model training process 508. In embodiments, each i-vector 506 comprises a subset of individual sub-vectors associated with different portions of each acoustic data 504. Upon receiving each acoustic data 504 with associated i-vector 506, acoustic data 504 may be segmented for acoustic model training, while a distributed representation of each may be generated for language model training.

The ASR model training process 508 relies on a neural network 518 to generate the generic ASR model 510. The i-vectors 506 may be generated, for example in the case of the TPO responses, based on information associated with individual user responses of the TPO, for example a speaker profile, or audio channel information and recording environment information. The ASR model generation process 508 also may receive a generic text corpus 514a that includes the original recitation item texts, and associated transcriptions of generic assessment item responses, or the retired TPO test prompts giving rise to the various acoustic data 504. The ASR model generation process may also receive the assessment information, including in an exemplary embodiment, previously prepared transcriptions of TPO responses and scoring information generated by human scorers for each acoustic data 504.

ASR training process 508 may generate a generic ASR model 510 including a language model 510a and an acoustic model 510b. Each model may be generated by a distinct neural network, or in embodiments, one or the other may be generated by any other suitable modeling process. For example, the acoustic model 510b may be generated using a neural network based methodology, while the language model 510a may be generated using a sequence discriminative training model. Text corpus information 514a and assessment information 514b including transcriptions may be used to generate language model 510a. Optionally, scoring reference vectors 512 may be generated for use with generic ASR model 510. Finally, once the acoustic data 504 of the generic acoustic library 502 is processed by process 508 outputs the generic ASR model 510. ASR language model generation process 508 may generate both the acoustic model 510b for generating features of the acoustic data 504 and the language model for generating transcripts based on the feature data. Alternatively the acoustic model may be supplied to ASR language model generation process 508. The neural network may be relied upon to generate the language model 510b using the generic text corpus 514a, if assessment items include recitation items, and assessment data 514b which may include human transcriptions and scores for spontaneous speech assessment times, or recitation items.

For example, the acoustic model 510a of the generic ASR model 510 may be prepared as follows using the TPO response database as an example: a neural network, e.g. 518, is a six-layer neural network with p-norm (p=2) nonlinearity trained using layer-wise supervised back-propagation training. Frames of 13-dimensional Mel-frequency cepstral coefficients (MFCCs) along with their $\Delta$ and $\Delta \Delta$ coefficients are extracted as acoustic features using a 25 ms frame-size with a 10 ms shift for 16 kHz 16-bit mono wave files, e.g. files 504. An i-vector, e.g. 506, of 100 dimensions per frame which represents speaker properties is appended to the MFCCs together as input to the DNN training module, e.g. 508. The i-vectors, e.g. 506, for each speaker are estimated in an online mode, where the frames prior to the current frame, including previous utterances of the same speaker are used. The DNN, e.g. 518, does multi-splicing temporal windowing of frames over time at each layer, and a sub-sampling technique is used to reduce computational cost. Preferably input layers splice the context frames over temporally closer-together frames (e.g., −2, −1, 0, 1, 2), and splice over temporally distant frames (e.g., −7, 7) in deeper layers. A normalization component may be applied after each hidden layer to maintain stability and to prevent the perceptrons from becoming "over-saturated". Preferably, sequence-discriminative training based on a state-level variant of the minimum phone error (MPE) criterion, called sMBR, may be applied on top of the DNN. For example, a trigram statistical LM with about 525K tri-grams, and 605K bi-grams over a lexicon of 23K words in may be trained using modified Knesser-Ney discounting by SRILM on the manual transcriptions of the same acoustic model training partition, which consists of 5.8M word tokens. The resulting acoustic language model may then serve as the generic language model, e.g. 510.

As mentioned above, applying content measurement to a generic acoustic model requires a collection of scored responses for training content reference vectors. Thus, for example in the iBT/TPO context, when newly retired iBT assessment items are incorporated into the TPO, these continuously increasing new prompts traditionally requires frequent human rating time and costs. But adding these manual transcription and scoring tasks brings extra costs and time consumption to the TPO test operation. Thus, in the exemplary TPO embodiment, the fact that all newly added TPO prompts are based on the TOEFL iBT prompts that have been used previously associated with adequate speech responses and human rated scores, these previously scored speech responses may serve as a basis to adapt a generic model, e.g. 510, with content measurement data automatically.

Figure 6:
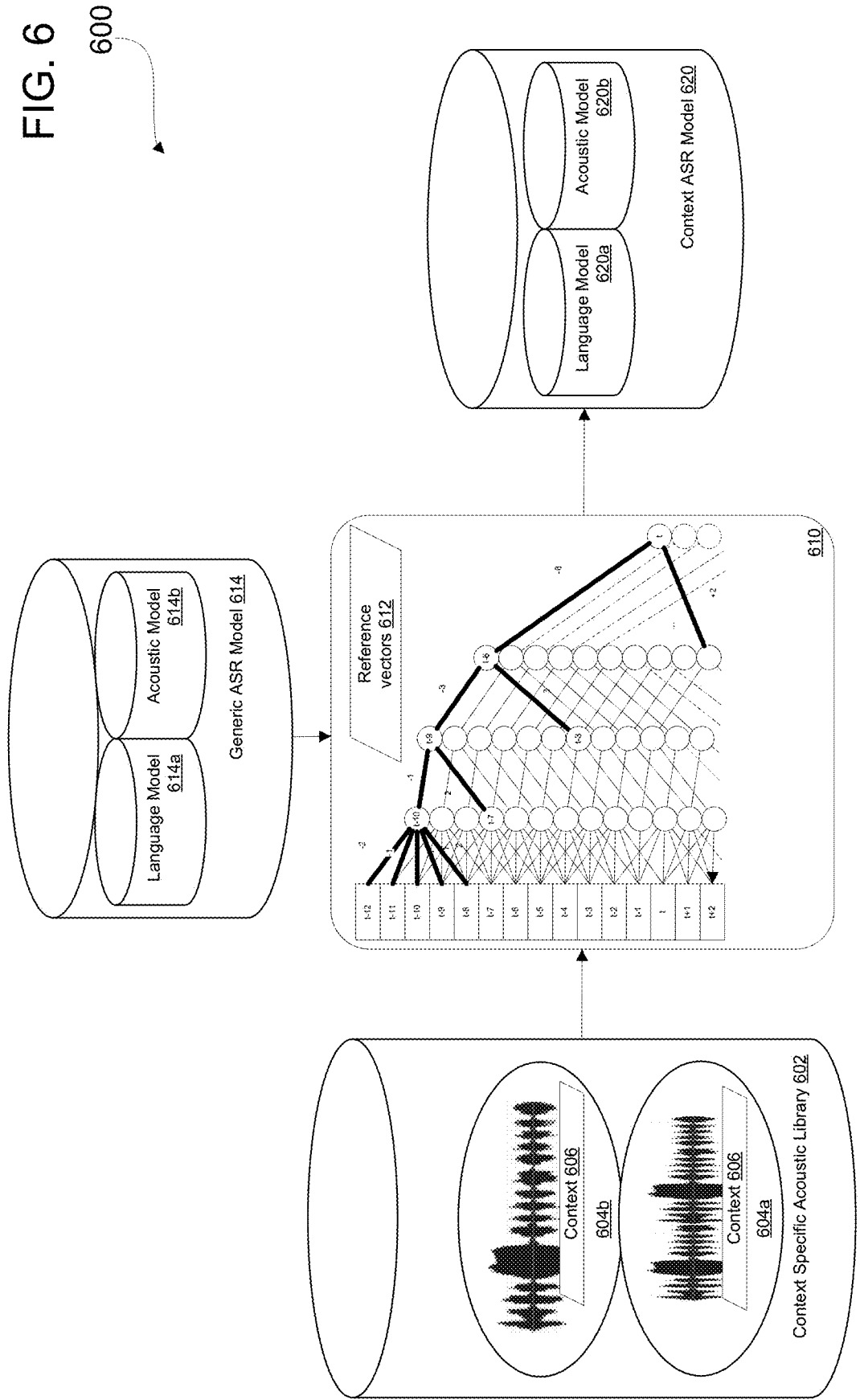
FIG. 6 illustrates a block diagram for training of a generic language model using a context specific acoustic corpus.

FIG. 6 depicts a block diagram 600 of a process for generating a context ASR model 620, which may include distinct acoustic model 620b, for example one trained using i-vectors as discussed above and a language model. Each may be generated by ASR training process 610, or ASR training process 610 may focus training on only one aspect. In embodiments, context specific acoustic data 604a and 604b are supplied to the ASR training process 610, which again may rely on a neural network such as a DNN or a TDNN. Although depicted as an TDNN, in embodiments, process 610 may further train one or the other models 620a, 620b using either a DNN, or using sequence discriminative training. For example 620a may be trained using a neural network, while 620b may be trained using a sequence discriminative model. The context specific acoustic data 604a, 604b may each comprise the same context 606, for example, they may all arise in response to the same assessment prompt or a same recitation item. Or, they may share all arise in response to a same set of assessment items. Thus, the content of the acoustic responses will each contain a similar context, which may be the subject matter of the assessment prompt, or assessment recitation item. In embodiments, the generic ASR model 614 is supplied to the language model generation process 610 in order to decode the acoustic data 604a, 604b. Generic ASR model 614, which may include distinct acoustic model 614b, for example one trained using i-vectors as discussed above, and a language model 614a, e.g. generated by ASR language model generation process 508. A context, or domain, specific ASR model 620 may then be trained using this decoded data set based on 604a, 604b and context 606. ASR training process 610 may receive acoustic data 604a and 604b and generate various representations for training purposes. Distributed representations may be generated as discussed above. Similarly, i-vector information may be generated for use in training purposes. In embodiments, training may further rely on frequency content vectors generated from acoustic data, or alternatively one-hot representations, and bi-gram tri-gram vectors may be generated. Optionally, ASR training module 610 may also generate scoring reference vectors 612 based on previously generated assessments of the context specific acoustic data.

In an exemplary embodiment based on iBT and TPO, a generic ASR model including an acoustic model is based on historical TPO responses with i-vector information and is used to decode spoken responses responsive to recently retired iBT responses (which are to be added to the TPO exam). It is preferable to avoid having to perform human scoring and transcription of TPO response to obtain assessment data of TPO responses, which include the varying channel data, speaker profile data, and environmental data of TPO users (e.g. in the form of i-vectors) that will be incorporated in a resulting acoustic model. But, the iBT responses (created under controlled conditions) may be used to generate a context specific language model, e.g. 620, that is based on the context of a specific assessment item. By automatically generating transcripts of the iBT responses using the generic ASR model, and then training a context specific ASR model using iBT responses and the automatically generated transcripts. This context specific ASR model can then be used to improve the generic language model without human scoring of TPO responses. The resulting model then contains user channel information associated with the historical TPO responses (which were previously transcribed), as well as content information from newly added assessment item responses (which have never been transcribed).

Figure 7:
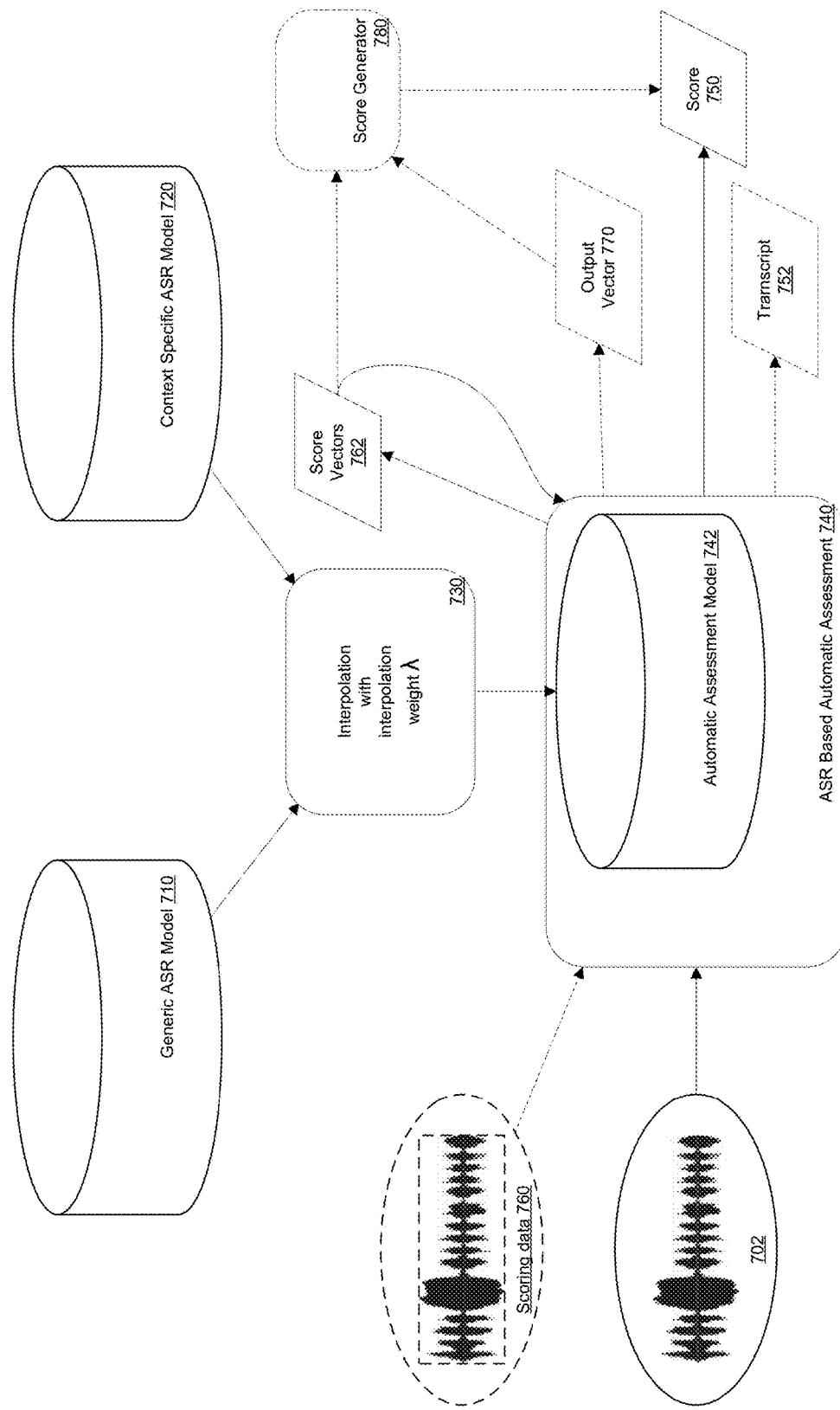
FIG. 7 illustrates a block diagram of a methodology to improve a generic language model using a context specific language model.

FIG. 7 depicts a block diagram 700 of one way to improve a generic ASR model 710 using a context specific ASR model 720. Each ASR model 710, 720 may include both an acoustic model and a language model. Having generated the models 710, 720 the models are then interpolated 730 in order to generate an assessment language model 742, which may include an acoustic model and a language for assessing acoustic responses to assessment items, e.g. 702. In embodiments, only the language models of 710 and 720 are interpolated, in other embodiments the acoustic models of 710 and 720 are interpolated, while in other embodiments both language models and acoustic models of 710 and 720 are interpolated. The automatic assessment model 742 is supplied to an ASR based automatic assessment process 740, which receives acoustic data 702 responsive to an assessment item. The ASR process 740 analyzes the acoustic data 702 to generate a score 750. Optionally, the ASR may also generate a transcription of the acoustic response data 702. In an exemplary embodiment, the generic ASR model 710 is includes an acoustic model generated based on TPO responses, which have been human scored discussed above. Similarly, the context specific ASR model 720 is generated based on iBT responses with accompanying assessment transcripts and scores as discussed above. Each ASR model 710, 720 may also include a language model. ASR 710 for example includes a language model generated based on previously prepared transcriptions of historic responses, while ASR 720 includes a language model trained in part on automatically generated transcriptions of newly added questions, e.g. retired iBT responses. These two models 710, 720 are interpolated 730 using an interpolation weight λ which is determined based on the perplexities between the generic model 710 and the domain, or context, specific model 720.

In order to generate reference vectors when using Content Vector Analysis (CVA) to score content relevancy, selected scoring responses 760 may be supplied to the ASR 740 based on the improved automatic assessment model 742 in order to train scoring vectors. For example, in TOEFL iBT and TPO, scores are categorized as 1, 2, 3, or 4. Selected iBT responses are selected based on their score and supplied to ASR, e.g. 740, in order to train a scoring vector associated with each score. In order to train a scoring vector associated with 1, a selected number of relevant iBT responses scored as 1 are supplied to ASR, which generates an automatic transcription using the integrated acoustic model, which is then supplied to the ASR language model in order to train a scoring reference vector associated with a score of 1. This is repeated for scores 2, 3 and 4 to obtain four scoring vectors.

In each case, the scoring vectors may be based on input vectors associated with scoring data 760, which includes the actual iBT responses, these input vectors may be generated by ASR process 740 or some other process. These vectors may be distributed representations generated according to the exemplary embodiments disclosed. When a retired iBT question is incorporated into a TPO question, a user taking an assessment including that question provides a response 702 that is submitted to ASR 740 without transcription. The ASR automatically generates a transcription using the integrated acoustic model (e.g. one trained using i-Vectors, or otherwise) and the transcription is submitted to the ASR 740's internal language model to generate an output vector 770, which is compare with the scoring vectors, for example scoring vector 762. Generating a score 750 then includes determining which scoring vector, e.g. 762 is closest to the obtained response output vector 770. This may be determined for example by the angle between two vectors. Alternatively, a scoring generator 780 may be separate and distinct from the ASR 740.

In an exemplary embodiment, the systems and methods described above have been compared with conventional approaches and show marked improvement, and near human WER where conventional approaches cannot attain this level of performance. To compare the disclosed techniques, a conventional method of measuring content relevance is employed. The CVA method is widely used. In a CVA model, a spoken response's ASR output is firstly converted to a vector. Each cell in the vector is a word's term frequency (TF) normalized by the inverse document frequency (idf), called to be tf-idf. The content relevance between two responses can be measured as the distance (e.g., cosine similarity score) between the two vectors. Typically, for each score level, a reference vector is trained using a set of responses having a specific score. Then, for an input response, the distance between an input's corresponding vector and reference vectors are used as content features. For each response's vectorization plan, various features may be extracted. In the exemplary embodiment, five features are extracted. The $cos_i$ refers to the cosine similarity between the input response's vector and a score-level (1 to 4) specific reference vector, similar to the scoring technique applied to the TOEFL test. The $argmax_{cos}$ refers to a score level judged by a maximum cosine similarity.

Against the CVA approach the distributed representation vectors disclosed herein are evaluated. Vectors for each response are produced such that the each vector contains 100 elements. DM and DBOW are employed, and variations thereof are also evaluated, as described above. In all five variations are utilized and compared against the reference CVA approach. Various reference vectors are built using the adaptation data to represent each of the four score points. As for training the reference vectors by using the distributed representation approach discussed herein, a set of individual vectors are generated from a set of responses for a particular score level. Then, the mean vector from all of these vectors is formed to be the reference vector for a particular score level. By using the various training methods described above, five vectorization approaches are employed: 1. DMC; 2. DMM; 3. DBOW; 4. DBOW+DMC; and 5. DBOW+DMM. Using a historical dataset of 24,000 iBT responses, reference vectors are trained for each of the four score levels (1 to 4) using each of the five vectoriation approaches, including using tf-idf values.

Using the disclosed ASR systems, built with a multi-splicing DNN AM with i-vectors and a generic trigram LM, achieves a 19.1% WER on the ASR evaluation dataset, which is a 16% relative WER reduction compared to the DNN ASR achieved in prior art methods using the same training and evaluation datasets. The performance of this system is close to human experts' WER of about 15% for non-native spontaneous speech. This is the lowest WER reported on TOEFL iBT non-native spontaneous speech assessment using ASR. The disclosed ASR system provides more accurate ASR hypotheses for the unsupervised LM adaptation over prior art methods. Table 1 compares the ASR performance using the generic LM with using the adapted LM adapted according to the disclosed methods. Because the prompts in the scoring corpus have no overlap with those in the ASR training corpus, the ASR using the generic LM has WERs of 40.09% and 38.84% on the sm-training and sm-evaluation partitions. Using unsupervised LM adaptation further reduces the WERs to 36.68% and 35.42% respectively, which are about 8.51% and 8.81% relative WER reductions. More importantly, this considerable WER reduction is achieved without any transcription or human intervention costs.

TABLE 1

| ASR: DNN AM | $WER_{SM\text{-}train}$ | $WER_{sm\text{-}eval}$ |
|---|---|---|
| Generic LM | 40.09 | 38.84 |
| Adapted LM | 36.68 | 35.42 |

Further, the two different distributed representation approaches to measuring content relevance are compared. Using the sm-train dataset, the Pearson correlations r between human-rated scores and two types of vector space based content features, i.e., $cos_4$ and $argmax_{cos}$, are evaluated. A high r suggests that corresponding features are more predictive. Table 2 details the results obtained for r values using the tf-idf (in CVA) and the five approaches for forming vectors disclosed herein. From the data is clear that the disclosed training approaches generate more accurate content measurement features than the prior art CVA method. The $argmax_{cos}$ feature is chosen to score because it has a consistently higher correlation with human scores than $cos_4$ across the all methods.

TABLE 2

| Representation | $Cos_4$ | $argmax_{cos}$ |
|---|---|---|
| CVA | 0.286 | 0.390 |
| DMC | 0.332 | 0.339 |
| DMM | 0.283 | 0.382 |
| DBOW | 0.299 | 0.432 |
| DBOW + DMC | 0.314 | 0.418 |
| DBOW + DMM | 0.288 | 0.403 |

Finally, the effects of ASR according to disclosed methods are evaluated on a speech scoring task. SpeechRater[SM], an automated scoring engine for assessing non-native English proficiency is employed to extract scoring features and predict a numerical score for spoken responses. The features are related to several aspects of the speaking construct, which include fluency, rhythm, intonation & stress, pronunciation, grammar, and vocabulary use. Automatic scoring feature selection based on LASSO regression is used to obtain a much smaller input feature set for building a linear regression model for score prediction. Note that linear regression (LR) is used (instead of other more powerful machine learning algorithms) to obtain a more interpretable model. Table 3 details the machine scoring results of the trained ASR systems with different scoring features as compared to a human-to-human (H-H) performance evaluation.

TABLE 3

| System | #F | $r_{item}$ | $k_{item}$ | $r_{spk}$ | $k_{spk}$ |
|---|---|---|---|---|---|
| H-H |  | 0.59 | 0.58 | 0.87 | 0.86 |
| Generic LM | 32 | 0.53 | 0.49 | 0.79 | 0.77 |
| Adapted LM | 28 | 0.54 | 0.50 | 0.80 | 0.77 |
| Adapted LM + distributed representations | 33 | 0.56 | 0.51 | 0.80 | 0.78 |
| Adapted LM + CVA | 34 | 0.58 | 0.53 | 0.82 | 0.80 |

As can be seen from Table 3, when using the ASR system after the unsupervised LM adaptation, the scoring performance is improved, compared to the ASR system using the generic LM. After adding the $argmax_{cos}$ features to the model, the scoring performance was further improved. When adding an additional $argmax_{cos}$ feature using the tf-idf CVA model, the overall scoring performance reached the highest level. In a summary, comparing the result reported using an ASR with a generic LM and lacking content measurement features, the final scoring model containing all of the disclosed methods, shows a considerable performance gain. In particular, on the item level, k increases from 0.49 to 0.53, and on the speaker level, k has increased from 0.77 to 0.80. As can be seen in Table 3, the system's performance becomes closer to human-to-human agreement results. For example, the final model's ritem becomes very close to H-H performance, that is respectively 0.58 vs. 0.59.

Figure 8:
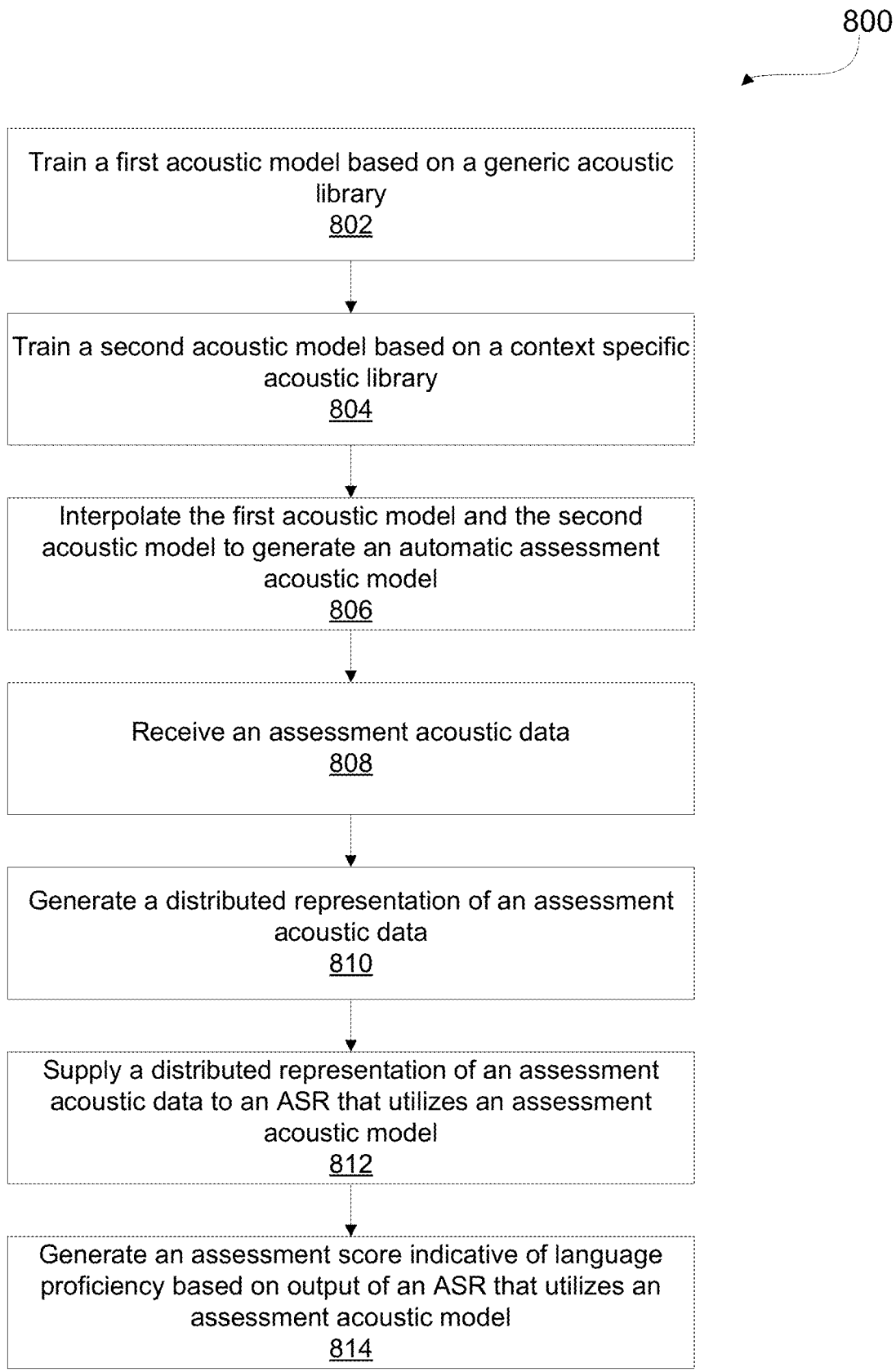
FIG. 8 illustrates a flow diagram depicting a method for providing automatic assessment of oral responses to an assessment item.

FIG. 8 is a flow diagram depicting a processor-implemented method for providing automatic assessment of oral responses to an assessment item, or prompt. A first ASR model is trained at 802 based on a generic acoustic library; each acoustic data file may have an accompanying i-vector. A second ASR model is trained at 804 based on a context specific acoustic library. At 806 the first ASR model and the second ASR model are interpolated to obtain a third ASR model. Then at 808 an assessment acoustic data is received, which may be an audible response to an assessment prompt. At 810 a distributed representation is generated based on the acoustic data, this distributed representation may further be based on a semantic vector associated with the acoustic data. At 812, a distributed representation of an assessment acoustic data is supplied to an ASR that is based on the assessment acoustic model. And responsive to the assessment acoustic data the ASR automatically generates a score indicative of language proficiency of a speaker generating the acoustic data.

Figure 9:
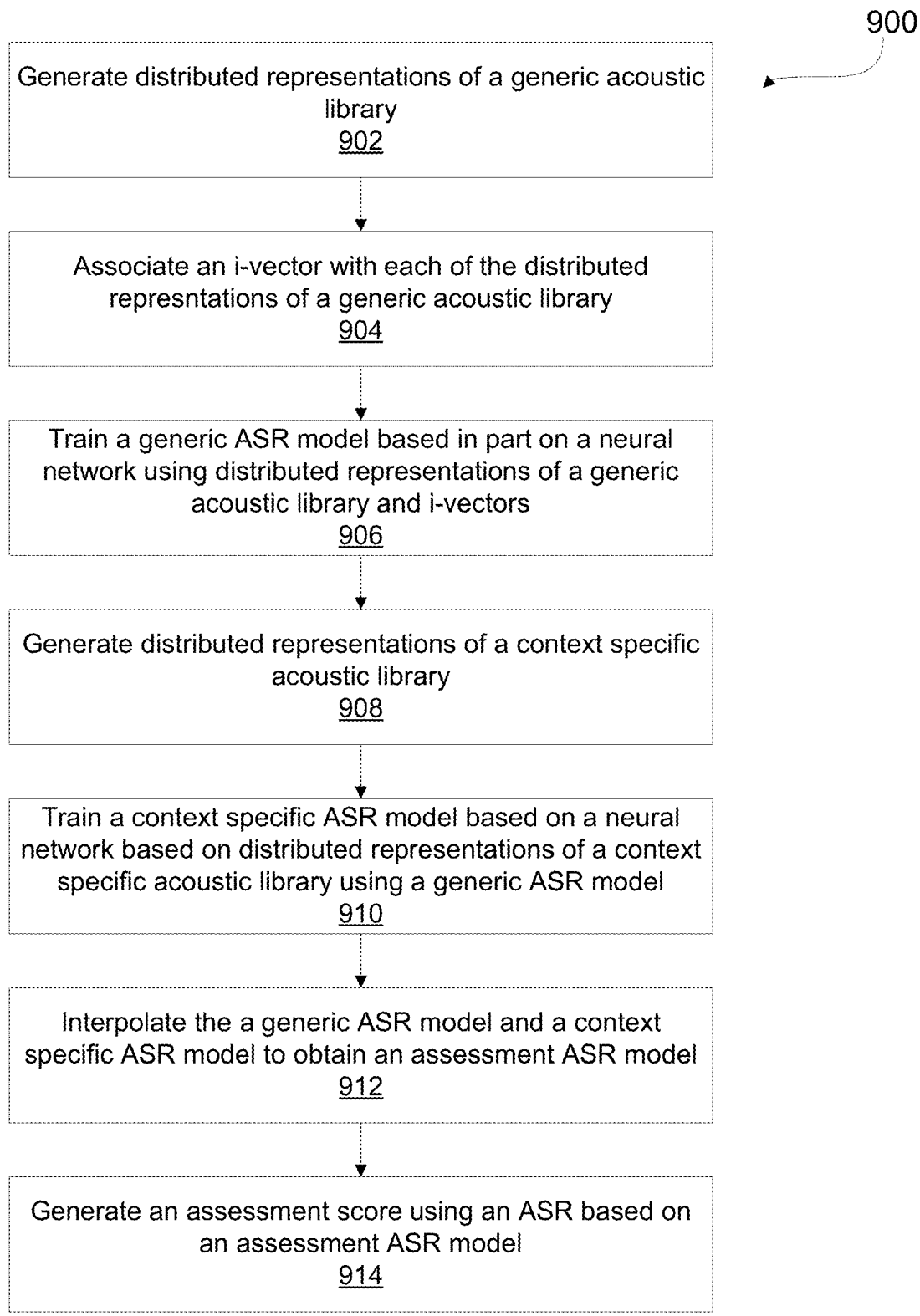
FIG. 9 illustrates a flow diagram depicting a method for providing automatic assessment of oral responses to an assessment item.

FIG. 9 is a flow diagram depicting a processor-implemented method for providing automatic assessment of oral responses to assessment items. At 902 a distributed representations are generated for a generic acoustic library. At 904 an i-vector as described herein is associated with each of the distributed representations. The distributed representations with associated i-vectors are used to generate an ASR model based in part on a neural network at 906. Then at 908 distributed representations associated with a context specific acoustic library are generated. The context specific distributed representations are used to train a context specific ASR model at 910. The context specific ASR model is interpolated with the generic ASR model to obtain an assessment ASR model at 912, which is then used by an ASR to generate an assessment score at 914.

FIG. 10a is a flow diagram depicting a processor-implemented method for providing a distributed representation of an acoustic data file. At 1002 a vector associated with an acoustic data file is generated. One or more first frame(s) of the acoustic data file are concatenated with the vector and supplied, at 1004, to the input layer of a three layer neural network. At 1006, a second acoustic frame of the acoustic file is supplied as a target vector of the neural network. Then at 1008 a distributed representation of the target frame is generated based on the weights of the neural network.

FIG. 10b is a flow diagram depicting a processor-implemented method for providing a distributed representation of an acoustic data file. At 1050 a transcription of an acoustic data file is generated. At 1052 a vector associated with the transcription is generated. One or more first words of the transcription are concatenated with the vector and supplied, at 1004, to the input layer of a three layer neural network. At 1006, a second word is supplied as a target vector of the neural network. Then at 1008 a distributed representation of the second word is generated based on the weights of the neural network.

Figure 11:
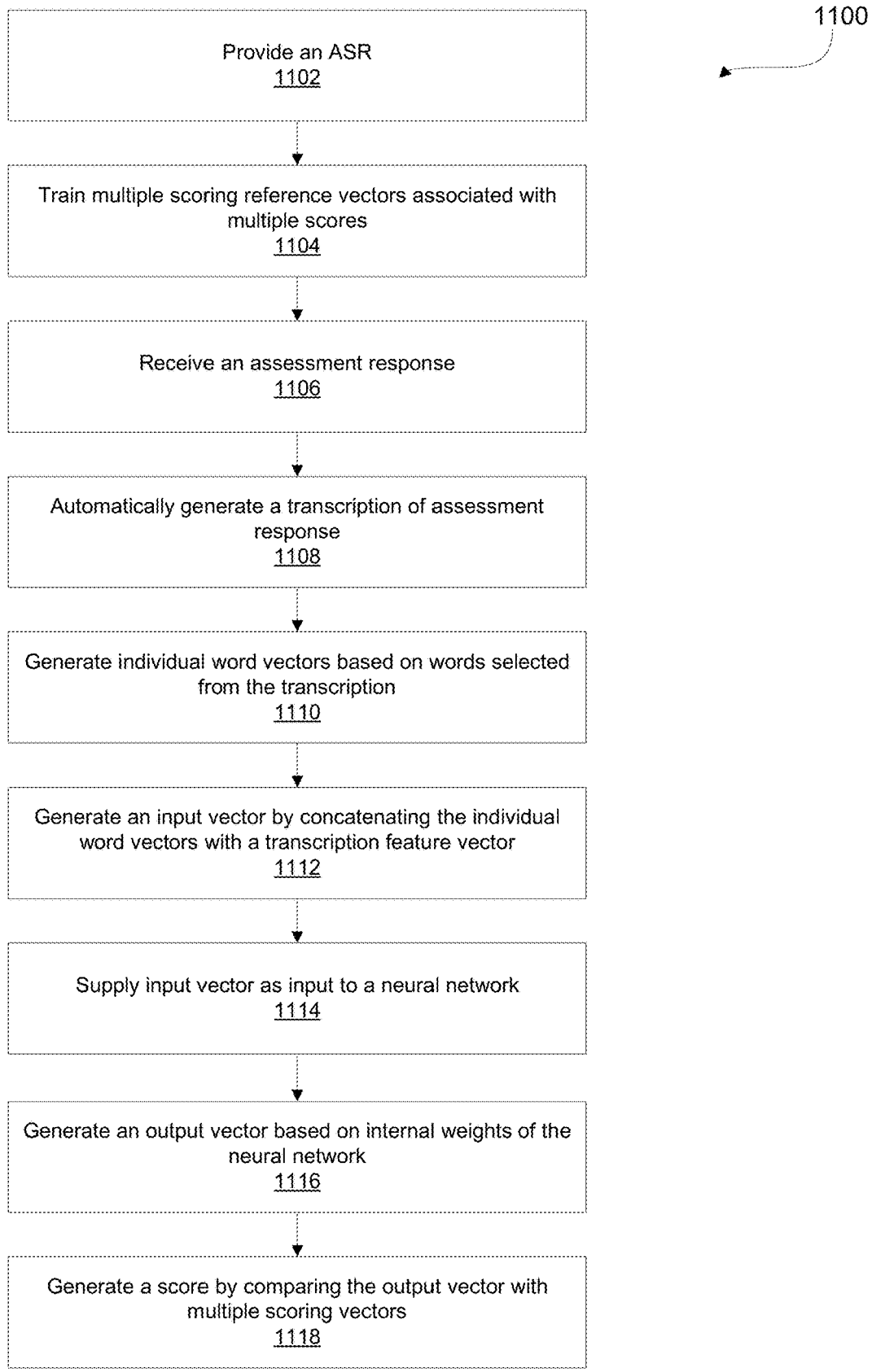
FIG. 11 is a flow diagram depicting a method for automatically generating a score of a language assessment.

FIG. 11 is a flow diagram depicting a method for automatically generating a score of a language assessment. The method comprises, at 1102, providing an automatic speech recognition ("ASR") scoring system. At 1104, training multiple scoring reference vectors associated with multiple scores. At 1106, an acoustic language assessment response is received. And, at 1108, automatically generating transcription based on an acoustic language assessment response. At 1110, generating an individual word vector based on one or more words selected from the transcription. At 1112, generating an input vector by concatenating the individual word vector with a transcription feature vector including features common to the transcription as a whole. At 1114 an input vector is supplied as input to a neural network, and at 1116 an output vector based on internal weights of the neural network is generated. A score is generated, at 1118, by comparing the output vector with the multiple scoring vectors, the score being based on which of the multiple scoring vectors is the closest to the output vector.

Figure 12:
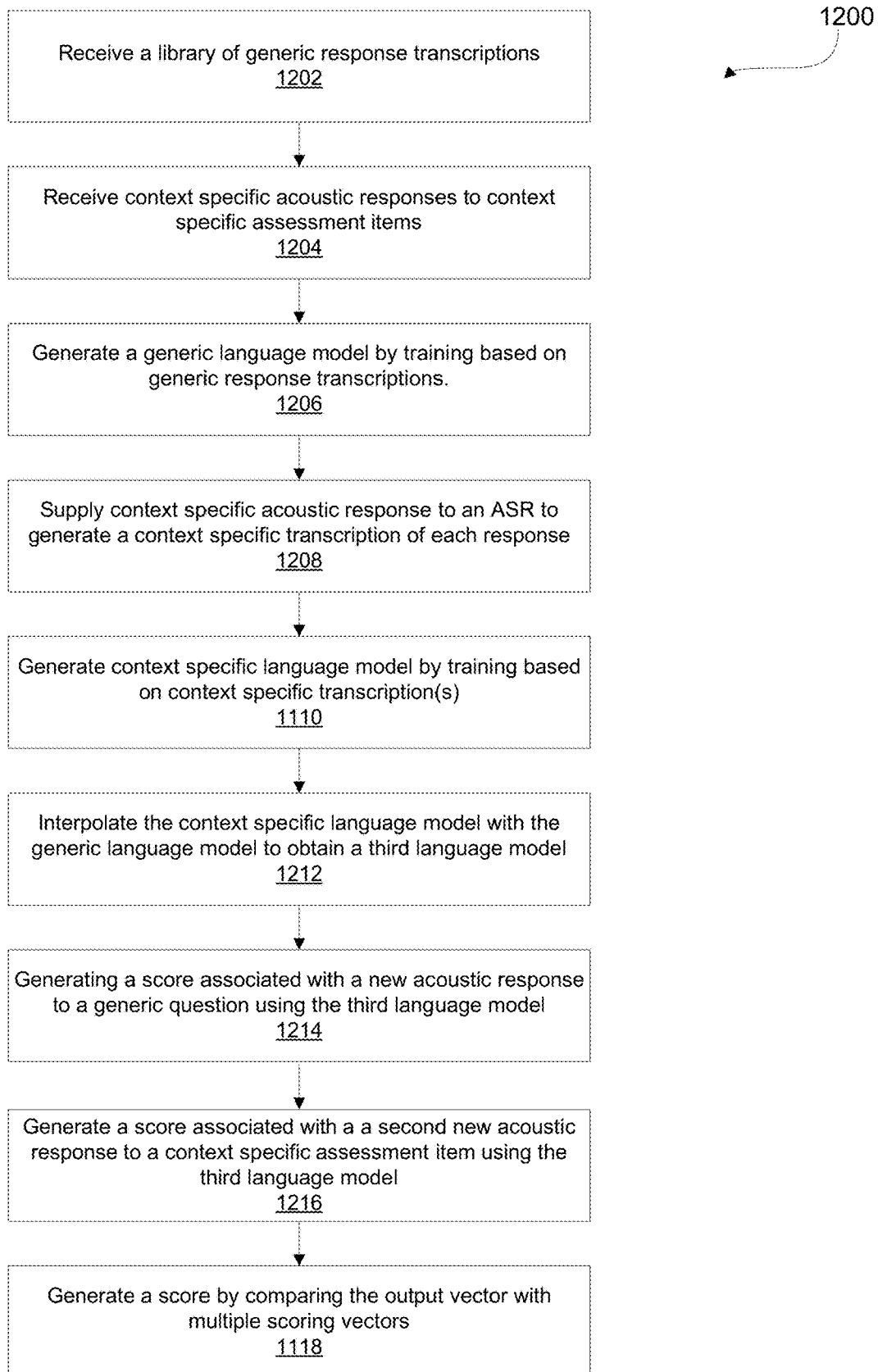
FIG. 12 is a flow diagram depicting a method for generating a language model for automatically scoring acoustic language assessments.

FIG. 12 is a flow diagram depicting a method for generating a language model for automatically scoring acoustic language assessments. The method includes, at 1202, receiving a library of generic acoustic response transcriptions to a plurality of generic assessment items. At 1204, receiving context specific acoustic responses to a context specific assessment item. At 1206, generating a generic language model by training based on the plurality of generic acoustic response transcriptions. A context specific acoustic response is supplied, at 1208, to an ASR to generate a context specific transcription corresponding to each context specific acoustic response. Then, at 1210 generating context specific language model by training based at least one context specific transcription. And, at 1212, interpolating the context specific language model with the generic language model.

Figure 13A:
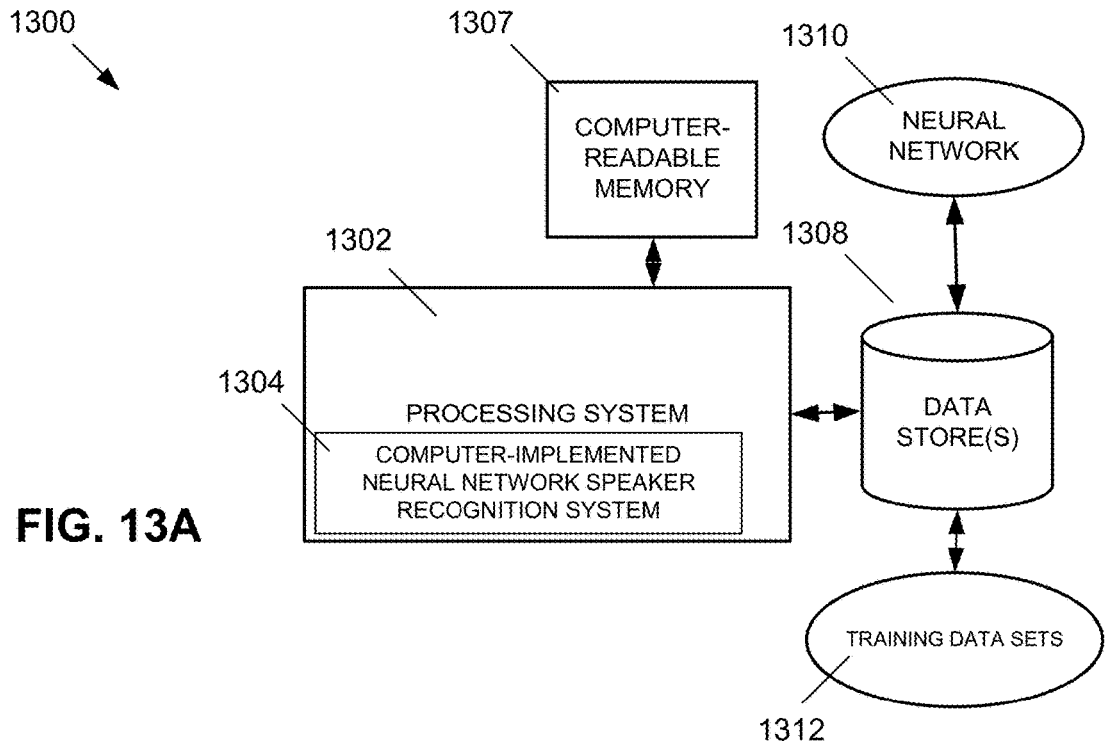
FIGS. 13a, 13b, and 13c depict example systems for implementing the approaches described herein for implementing a computer-implemented neural network speaker recognition system.
Figure 13B:
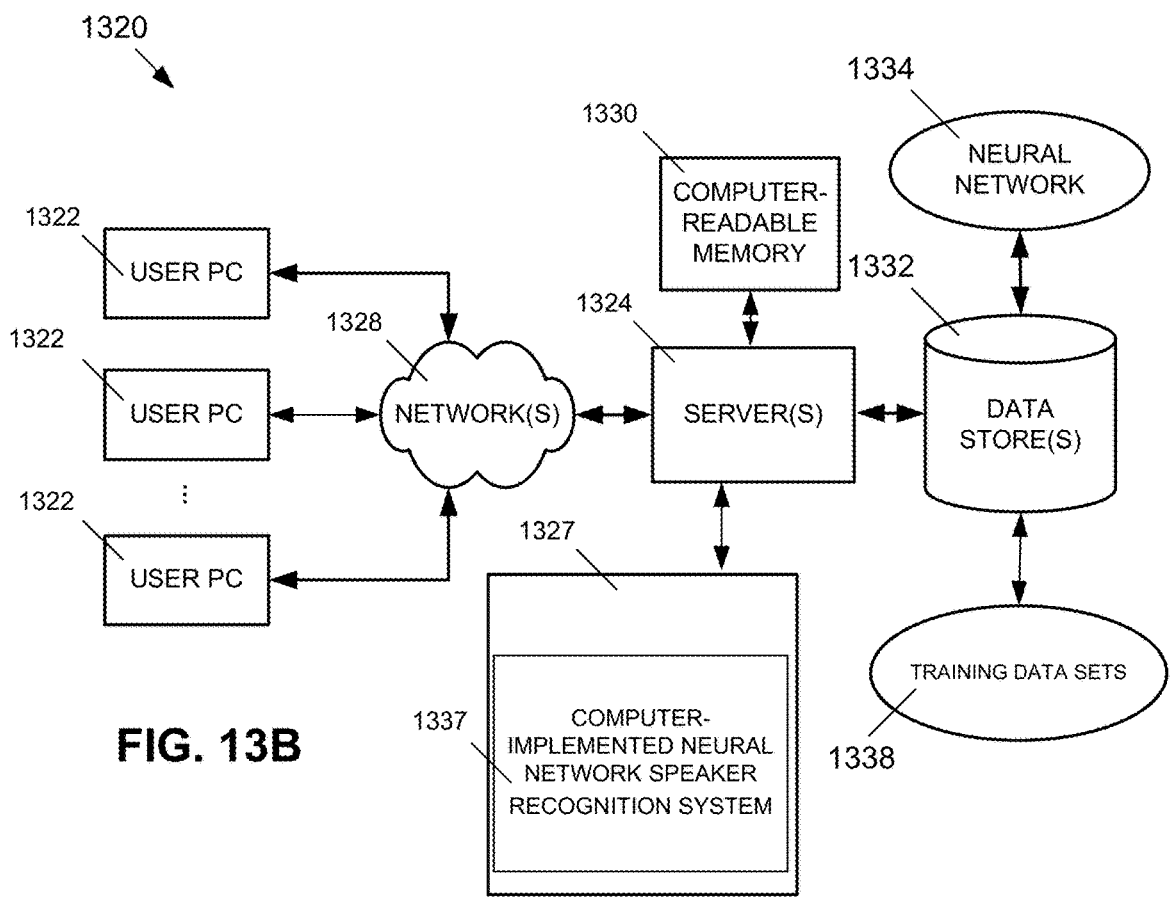
Figure 13C:
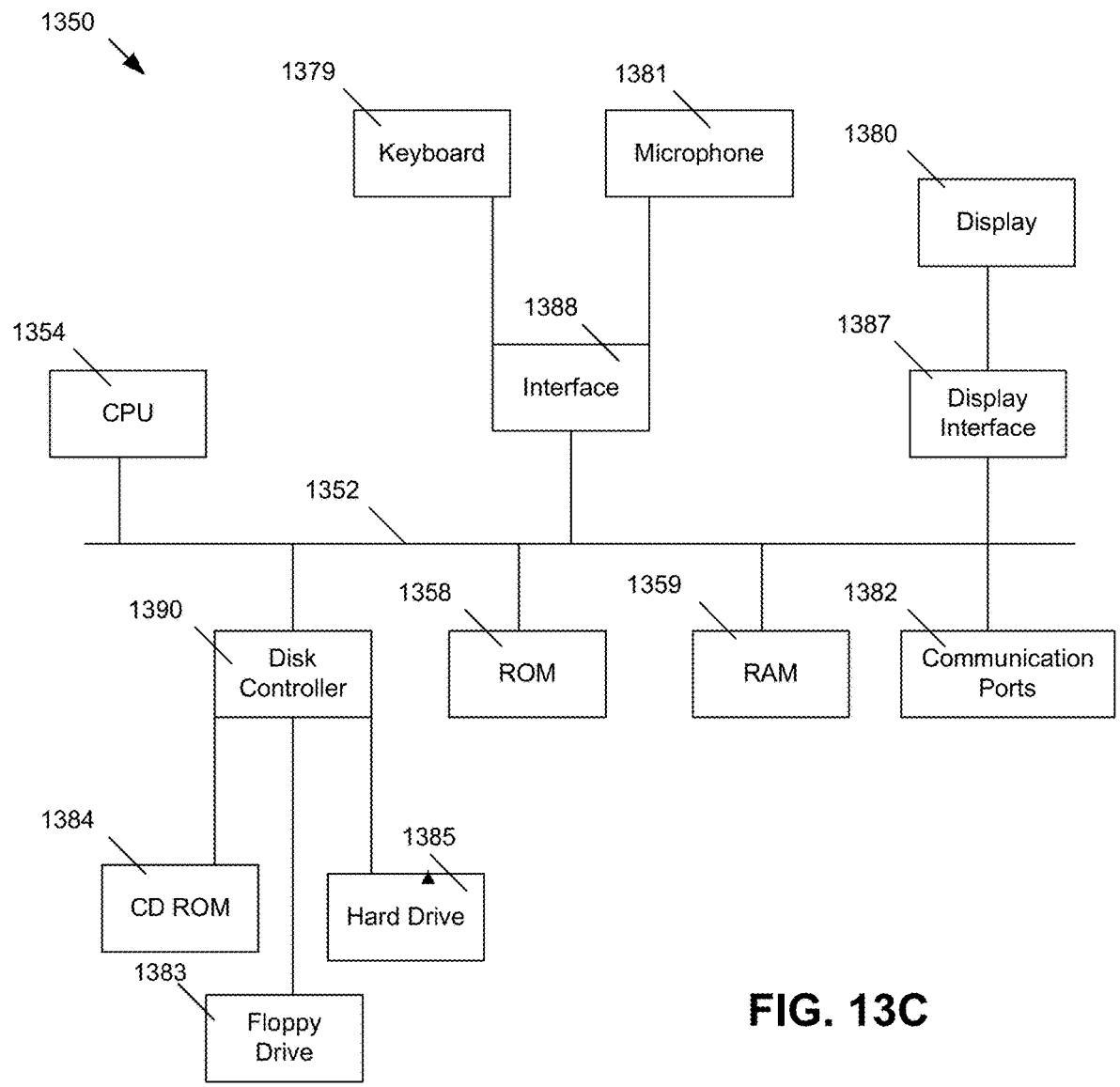

FIGS. 13A, 13B, and 13C depict example systems for implementing the approaches described herein for implementing a computer-implemented neural network speaker recognition system. For example, FIG. 13A depicts an exemplary system 1300 that includes a standalone computer architecture where a processing system 1302 (e.g., one or more computer processors located in a given computer or in multiple computers that may be separate and distinct from one another) includes a computer-implemented neural network speaker recognition system 1304 being executed on the processing system 1302. The processing system 1302 has access to a computer-readable memory 1307 in addition to one or more data stores 1308. The one or more data stores 1308 may include neural networks 1310 as well as training data sets 1312. The processing system 1302 may be a distributed parallel computing environment, which may be used to handle very large-scale data sets.

FIG. 13B depicts a system 1320 that includes a client-server architecture. One or more user PCs 1322 access one or more servers 1324 running a computer-implemented neural network speaker recognition system 1337 on a processing system 1327 via one or more networks 1328. The one or more servers 1324 may access a computer-readable memory 1330 as well as one or more data stores 1332. The one or more data stores 1332 may include neural networks 1334 as well as training data sets 1338.

FIG. 13C shows a block diagram of exemplary hardware for a standalone computer architecture 1350, such as the architecture depicted in FIG. 13A that may be used to include and/or implement the program instructions of system embodiments of the present disclosure. A bus 1352 may serve as the information highway interconnecting the other illustrated components of the hardware. A processing system 1354 labeled CPU (central processing unit) (e.g., one or more computer processors at a given computer or at multiple computers), may perform calculations and logic operations required to execute a program. A non-transitory processor-readable storage medium, such as read only memory (ROM) 1358 and random access memory (RAM) 1359, may be in communication with the processing system 1354 and may include one or more programming instructions for performing the method of implementing a computer-implemented neural network speaker recognition system. Optionally, program instructions may be stored on a non-transitory computer-readable storage medium such as a magnetic disk, optical disk, recordable memory device, flash memory, or other physical storage medium.

In FIGS. 13A, 13B, and 13C, computer readable memories 1308, 1330, 1358, 1359 or data stores 1308, 1332, 1383, 1384, 1388 may include one or more data structures for storing and associating various data used in the example systems for implementing a computer-implemented neural network speaker recognition system. For example, a data structure stored in any of the aforementioned locations may be used to store data from XML files, initial parameters, and/or data for other variables described herein. A disk controller 1390 interfaces one or more optional disk drives to the system bus 1352. These disk drives may be external or internal floppy disk drives such as 1383, external or internal CD-ROM, CD-R, CD-RW or DVD drives such as 1384, or external or internal hard drives 1385. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1390, the ROM 1358 and/or the RAM 1359. The processor 1354 may access one or more components as required.

A display interface 1387 may permit information from the bus 1352 to be displayed on a display 1380 in audio, graphic, or alphanumeric format. Communication with external devices may optionally occur using various communication ports 1382.

In addition to these computer-type components, the hardware may also include data input devices, such as a keyboard 1379, or other input device 1381, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.).

It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed:

1. A system for automatically generating a score of a language assessment comprising:
    a processing system comprising one or more data processors; and
    a non-transitory computer-readable medium encoded with instructions for commanding the processing system to execute steps comprising:
        accessing, with an automatic speech recognition (ASR) scoring system, one or more trained scoring reference vectors
        receiving an assessment response;
        generating an individual word vector based on a word selected from the assessment response;
        generating an input vector by concatenating the individual word vector with an assessment response feature vector including features common to the assessment response as a whole;
        supplying the input vector as input to a neural network of the ASR to obtain an output vector based on the input vector and internal weights of the neural network; and
        generating a score by determining which of the one or more trained scoring vectors is closest to the output vector.

2. The system of claim 1, wherein the one or more trained scoring reference vectors are trained vectors, trained by:
    obtaining first historic responses;
    obtaining a score data for each respective historic response;
    categorize each respective historic response into one of multiple score ranges;
    for each of the multiple score ranges, train a respective scoring reference vector based on each historic response categorized into a respective score range of the multiple score ranges.

3. The system of claim 1, wherein the one or more trained scoring reference vectors include two vectors associated with two scores.

4. The system of claim 1, wherein assessment response is an acoustic response and the ASR includes an acoustic model trained on one or more historical responses having associated i-vectors containing channel information associated with one of either (i) historic acoustic responses associated with home based tests or (ii) historic acoustic responses associated with standardized equipment.

5. The method of claim 1, wherein the ASR includes a language model formed by interpolating a generic language model with a context specific language model.

6. A system for generating a language model for automatically scoring language assessments for implementation by one or more computer processors forming part of at least one computing device, the system comprising:
　a processing system comprising one or more data processors; and
　a non-transitory computer-readable medium encoded with instructions for commanding the processing system to execute steps comprising:
　　accessing a library of generic responses to a plurality of generic assessment items;
　　receiving context specific responses to a context specific assessment item;
　　generating a generic language model associated with the generic responses;
　　generating a context specific language model associated with the context specific responses; and
　　generating a model for automatically scoring language assessments by interpolating the context specific language model with the generic language model.

7. The system of claim 6, wherein the context specific assessment item is separate and distinct from the generic assessment items.

8. The system of claim 6, wherein the generic responses include i-vectors containing channel information associated with one of either (i) historic acoustic responses associated with home based tests or (ii) historic acoustic responses associated with standardized equipment.

9. The system of claim 8, the method further comprising:
　receiving a new response to a new assessment item;
　generating a new transcript of the new response using the context specific language model; and
　generating a score for the new response based on the new transcript.

10. A system for implementation by one or more computer processors forming part of at least one computing device, the system comprising:
　a processing system comprising one or more data processors; and
　a non-transitory computer-readable medium encoded with instructions for commanding the processing system to execute steps comprising:
　　receiving an assessment acoustic data representative of a spoken recitation of a portion of an assessment text corpus;
　　generating a first distributed representation of the assessment acoustic data;
　　supplying the first distributed representation to a first language model to obtain output features associated with the assessment acoustic data; and
　　generating an assessment score based on the output features and indicative of the language proficiency of the spoken recitation, wherein the first language model is generated by:
　　　training a second language model based on a generic acoustic library;
　　　training a third language model based on a context specific acoustic library;
　　　generating the first language model by performing linear interpolation using the second language model and the third language model.

11. The system of claim 10 further including generating a distributed representation of the new response.

12. The system of claim 10 wherein the steps further comprise generating the first language model by:
　training a second language model based on a generic acoustic library;
　training a third language model based on a context specific acoustic library;
　generating the first language model by performing linear interpolation using the second language model and the third language model.

13. The system of claim 12 wherein the second language model is part of an ASR including a first deep neural network ("DNN") trained using the generic acoustic library, the first DNN having a first input layer and a first output, wherein the generic acoustic library includes a plurality of first distinct acoustic representations of portions of a first training text corpus, further wherein training the first DNN comprises:
　applying a second distributed representation to the first input layer, the second distributed representation based on one of the first distinct acoustic representations;
　generating an error measurement based on the first output responsive to applying the second distributed representation to the first input layer; and
　adjusting at least one weight of the first DNN by back propagating the error measurement through the first DNN.

14. The system of claim 13 wherein the third language model is part of an ASR including a second DNN trained using a context specific acoustic library, the second DNN having a second input layer and a second output, wherein the context specific acoustic library includes a plurality of distinct context specific acoustic representations of context specific portions of a context specific text corpus, further wherein training the second DNN comprises:
　supplying at least one of the distinct context specific acoustic representations to the first DNN to obtain a third distributed representation;
　applying the third distributed representation to the second input layer;
　generating a second error measurement based on the second output responsive to applying the third distributed representation to the second input layer; and
　adjusting at least one second weight of the second DNN by back propagating the second error measurement through the second DNN, and further wherein the generating a first distributed representation of the assessment acoustic data includes automatically generating a transcription of the assessment acoustic data, the first distributed representation being based on text of the transcription.

15. The system of claim 10, wherein the first language model includes a matrix of weights of a neural network having an input layer, a hidden layer, and an output layer, and the assessment score is generated by:
　supplying selected word representations of the assessment acoustic data to serve as the target layer of the neural network, and supplying surrounding word representations to an input layer of the neural network, wherein the matrix of weights of the neural network is trained to generate the output features, wherein the output features are the result of training the three layer neural network to predict the target layer responsive to the input layer.

16. The system of claim 10, wherein generating a first distributed representation of the assessment acoustic data comprises:
   selecting at least one acoustic frame of the assessment acoustic data; and
   generating a vector comprising a fixed number of features based on the selected acoustic frame(s).

17. The system of claim 16, wherein generating a vector comprises:
   supplying an acoustic frame(s) of the assessment acoustic data to a neural network; and
   while supplying the acoustic frame(s) to the neural network, supplying a second vector to the neural network, the second vector containing context information associated with all frames of the assessment acoustic data, the vector being based on the output of the neural network responsive to simultaneously supplying the acoustic frame(s) and the second vector to the neural network, wherein the neural includes:
   (i) an input layer, a hidden layer, and an output layer, and the acoustic frame(s) are supplied to serve as the target layer, and wherein generating a vector further comprises supplying surrounding frame(s) concatenated with the second vector to the second input layer of the neural network, and the output features comprise a matrix of trained weights being the result of training the three layer neural network to predict the target layer responsive to the second input layer; or
   (ii) an input layer, a hidden layer, and an output layer, and the acoustic frame(s) are supplied to serve as the input layer, and wherein generating a vector further comprises supplying surrounding frame(s) concatenated with the second vector to the target layer of the neural network, and the output features comprise a matrix of trained weights being the result of training the three layer neural network to predict the target layer responsive to the second input layer.

18. A non-transitory computer-readable medium encoded with instructions for commanding a processing system that includes one or more data processors to execute a method for automatically generating a score of a language assessment, the steps comprising:
   accessing, with an automatic speech recognition (ASR) scoring system, one or more trained scoring reference vectors
   receiving an assessment response;
   generating an individual word vector based on a word selected from the assessment response;
   generating an input vector by concatenating the individual word vector with an assessment response feature vector including features common to the assessment response as a whole;
   supplying the input vector as input to a neural network of the ASR to obtain an output vector based on the input vector and internal weights of the neural network; and
   generating a score by determining which of the one or more trained scoring vectors is closest to the output vector.

19. A non-transitory computer-readable medium encoded with instructions for commanding a processing system that includes one or more data processors to execute a method for generating a language model for automatically scoring language assessments, the steps comprising:
   accessing a library of generic responses to a plurality of generic assessment items;
   receiving context specific responses to a context specific assessment item;
   generating a generic language model associated with the generic responses;
   generating a context specific language model associated with the context specific responses; and
   generating a model for automatically scoring language assessments by interpolating the context specific language model with the generic language model.

20. A non-transitory computer-readable medium encoded with instructions for commanding a processing system that includes one or more data processors to execute a method for automatically generating an assessment score, the steps comprising:
   receiving an assessment acoustic data representative of a spoken recitation of a portion of an assessment text corpus;
   generating a first distributed representation of the assessment acoustic data;
   supplying the first distributed representation to a first language model to obtain output features associated with the assessment acoustic data; and
   generating an assessment score based on the output features and indicative of the language proficiency of the spoken recitation, wherein the first language model is generated by:
   training a second language model based on a generic acoustic library;
   training a third language model based on a context specific acoustic library;
   generating the first language model by performing linear interpolation using the second language model and the third language model.

* * * * *